US008523658B2

(12) United States Patent
Haag et al.

(10) Patent No.: US 8,523,658 B2
(45) **Date of Patent: *Sep. 3, 2013**

(54) GAMING DEVICE HAVING ALTERNATE OUTCOME PRESENTATIONS

(75) Inventors: David Haag, Las Vegas, NV (US); Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/586,635

(22) Filed: Aug. 15, 2012

(65) Prior Publication Data

US 2012/0309497 A1 Dec. 6, 2012

Related U.S. Application Data

(63) Continuation of application No. 11/759,597, filed on Jun. 7, 2007, now Pat. No. 8,246,437, which is a continuation of application No. 11/208,277, filed on Aug. 18, 2005, now Pat. No. 7,229,351, which is a continuation of application No. 10/446,558, filed on May 28, 2003, now Pat. No. 6,964,609.

(51) Int. Cl.
*A63F 13/00* (2006.01)

(52) U.S. Cl.
USPC .................................. 463/20; 463/16; 463/31

(58) Field of Classification Search
USPC .................................. 463/16–20, 30, 31, 35
See application file for complete search history.

(56) References Cited

U.S. PATENT DOCUMENTS

| | | | |
|---|---|---|---|
| 1,527,929 | A | 2/1925 | Simons |
| 3,642,287 | A | 2/1972 | Lally et al. |
| 4,560,161 | A | 12/1985 | Hamano |
| 4,582,324 | A | 4/1986 | Koza et al. |
| 4,618,150 | A | 10/1986 | Kimura |
| 4,695,053 | A | 9/1987 | Vazquez, Jr. et al. |
| 4,743,022 | A | 5/1988 | Wood |
| 5,152,529 | A | 10/1992 | Okada |
| 5,707,286 | A | 1/1998 | Carlson |
| 5,766,074 | A | 6/1998 | Cannon et al. |
| 5,788,573 | A | 8/1998 | Baerlocher et al. |
| 5,823,874 | A | 10/1998 | Adams |

(Continued)

FOREIGN PATENT DOCUMENTS

| | | |
|---|---|---|
| GB | 2 201 821 | 9/1988 |
| WO | 0032286 | 6/2000 |

OTHER PUBLICATIONS

The Game of Life Article, written by Strictly Slots, published Jun. 2002.

(Continued)

*Primary Examiner* — Lawrence Galka

(74) *Attorney, Agent, or Firm* — Neal, Gerber & Eisenberg LLP

(57) ABSTRACT

A gaming device and a method of playing a gaming device which includes a game having a plurality of presentations associated with outcomes or combinations in a game. Specifically, the each outcome or combination includes a default presentation and at least one of the outcomes includes one or more alternate presentations. The default and alternate presentations include probabilities of being selected by the processor. In a game, the processor predetermines the winning outcome or non-winning outcome to provide to the player and then selects one of the presentations associated with the determined outcome. The gaming device selects the presentation based on the probabilities of being selected associated with the presentations. The gaming device then provides any award associated with the determined combination to the player.

52 Claims, 31 Drawing Sheets

(56) References Cited

U.S. PATENT DOCUMENTS

| | | | |
|---|---|---|---|
| 5,848,932 | A | 12/1998 | Adams |
| 5,882,261 | A | 3/1999 | Adams |
| 5,911,418 | A | 6/1999 | Adams |
| 5,934,672 | A | 8/1999 | Sines et al. |
| 5,947,820 | A | 9/1999 | Morro et al. |
| 6,015,346 | A | 1/2000 | Bennett |
| 6,068,552 | A | 5/2000 | Walker et al. |
| 6,089,976 | A | 7/2000 | Schneider et al. |
| 6,089,978 | A | 7/2000 | Adams |
| 6,149,157 | A | 11/2000 | Suan |
| 6,159,095 | A | 12/2000 | Frohm et al. |
| 6,162,121 | A | 12/2000 | Morro et al. |
| 6,168,520 | B1 | 1/2001 | Baerlocher et al. |
| 6,174,235 | B1 | 1/2001 | Walker et al. |
| 6,190,255 | B1 | 2/2001 | Thomas et al. |
| 6,224,483 | B1 | 5/2001 | Mayeroff |
| 6,238,288 | B1 | 5/2001 | Walker et al. |
| 6,261,177 | B1 | 7/2001 | Bennett |
| 6,270,409 | B1 | 8/2001 | Shuster |
| 6,315,664 | B1 | 11/2001 | Baerlocher et al. |
| 6,319,124 | B1 | 11/2001 | Baerlocher et al. |
| 6,322,309 | B1 | 11/2001 | Thomas et al. |
| 6,334,814 | B1 | 1/2002 | Adams |
| 6,347,996 | B1 | 2/2002 | Gilmore et al. |
| 6,358,147 | B1 | 3/2002 | Jaffe et al. |
| 6,386,974 | B1 | 5/2002 | Adams |
| 6,443,837 | B1 | 9/2002 | Jaffe et al. |
| 6,454,649 | B1 | 9/2002 | Mattice et al. |
| 6,561,902 | B1 | 5/2003 | Walker et al. |
| 6,565,436 | B1 | 5/2003 | Baerlocher |
| 6,582,306 | B1 | 6/2003 | Kaminkow |
| 6,605,000 | B2 | 8/2003 | Adams |
| 6,616,142 | B2 | 9/2003 | Adams |
| 6,663,488 | B1 | 12/2003 | Adams |
| 7,066,814 | B2 | 6/2006 | Glavich et al. |
| 7,618,317 | B2 | 11/2009 | Jackson |
| 2002/0077165 | A1 | 6/2002 | Bansemer et al. |
| 2003/0036424 | A1 | 2/2003 | Baerlocher |
| 2003/0144052 | A1 | 7/2003 | Walker et al. |
| 2007/0111778 | A1 | 5/2007 | Walker et al. |
| 2008/0070699 | A1 | 3/2008 | Park |

OTHER PUBLICATIONS

The Game of Life Advertisement, written by Sigma, published Sep. 2002.

FIG. 3B

103

104 106 108

| COMBINATION | DISPLAY TYPES | PROBABILITY | AWARD |
|---|---|---|---|
| ROYAL FLUSH | DEFAULT | 100% | 1000 |
| STRAIGHT FLUSH | DEFAULT | 70% | 500 |
| | ALTERNATE #1 | 30% | |
| FOUR OF A KIND | DEFAULT | 50% | 100 |
| | ALTERNATE #1 | 30% | |
| | ALTERNATE #2 | 20% | |
| FULL HOUSE | DEFAULT | 60% | 80 |
| | ALTERNATE #1 | 30% | |
| | ALTERNATE #2 | 10% | |
| FLUSH | DEFAULT | 60% | 60 |
| | ALTERNATE #1 | 40% | |
| STRAIGHT | DEFAULT | 75% | 50 |
| | ALTERNATE #1 | 25% | |
| THREE OF A KIND | DEFAULT | 75% | 20 |
| | ALTERNATE #1 | 25% | |
| TWO PAIR | DEFAULT | 70% | 10 |
| | ALTERNATE #1 | 20% | |
| | ALTERNATE #2 | 10% | |
| PAIR (JACKS OR BETTER) | DEFAULT | 80% | 5 |
| | ALTERNATE #1 | 20% | |
| NON-WINNING HAND | DEFAULT | 90% | Ø |
| | ALTERNATE #1 | 10% | |

110

703

706 708 710

| SYMBOL COMBINATION | DISPLAY TYPES | PROBABILITY | AWARD |
|---|---|---|---|
| BAR BAR BAR | DEFAULT | 70% | 1000 |
| | ALTERNATE #1 | 20% | |
| | ALTERNATE #2 | 10% | |
|  | DEFAULT | 60% | 250 |
| | ALTERNATE #1 | 40% | |
|  | DEFAULT | 65% | 100 |
| | ALTERNATE #1 | 35% | |
|  | DEFAULT | 80% | 80 |
| | ALTERNATE #1 | 15% | |
| | ALTERNATE #2 | 5% | |
|  | DEFAULT | 70% | 25 |
| | ALTERNATE #1 | 30% | |
| NON-WINNING COMBINATIONS | DEFAULT | 90% | Ø |
| | ALTERNATE #1 | 10% | |

712

GAMING DEVICE HAVING ALTERNATE OUTCOME PRESENTATIONS

PRIORITY CLAIM

This application is a continuation of, claims priority to and the benefit of U.S. patent application Ser. No. 11/759,597, filed on Jun. 7, 2007, which is a continuation of, claims priority to and the benefit of U.S. patent application Ser. No. 11/208,277, filed on Aug. 18, 2005, now U.S. Pat. No. 7,229,351, which is a continuation of, claims priority to and the benefit of U.S. patent application Ser. No. 10/446,558, filed on May 28, 2003, now U.S. Pat. No. 6,964,609, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Known gaming devices include wagering games that provide outcomes such as awards to a player after a player plays the game. The wagering games typically display the award after the award generation. The games then provide the award to the player and end the game or move on to other game activity or related game. An award or monetary win provides excitement and enjoyment to the player. Awards and monetary wins also attract passersby or persons observing a wagering game in progress.

Players become accustomed to wagering games in gaming machines after repeatedly playing the wagering games. While players feel comfortable playing games with which they are familiar, players can tire of repetitious games, especially those involving relatively little player interaction. Players may also tire of games that include the same display or displays such as the same display of winning outcomes related to the game. A need therefore exists to enhance the award issuance portion of a game of a gaming device. A need also exists to add variety to at least a portion of a wagering game, such that the game provides variety, excitement, and enjoyment to the player.

SUMMARY

One embodiment of the present invention is directed to a gaming device and a method of playing a gaming device including a game having a plurality of presentations or displays of combinations in a game wherein a default presentation is associated with each of the combinations and at least one alternate presentation is associated with at least one of the combinations.

In one embodiment, the gaming device displays a primary or base game including a card game, a reel or slot game or any other suitable type of wagering game to a player. The gaming device then enables the player to play the base game. The gaming device displays a winning outcome or a non-winning outcome to the player associated with the type of game being played by the player. In this embodiment, one or more game presentations are associated with each outcome in the game. The presentations include default presentations which include the standard or typical presentation or display for an outcome in a game, and alternate presentations which include presentations of the outcome that are different than the default presentations.

The alternate presentations add variety to a game by providing one or more different presentations in the game to a player. In a game, at least two of the alternate presentations may be different, a plurality of the alternate presentations may be different, or all of the alternate presentations may be different. Additionally, the alternate presentations may include different presentations of the same base game or at least one presentation associated with a different game than the primary or base game. For example, the base game is a card game and the alternate presentation is associated with a different game such as a reel game. Furthermore, a plurality of the alternate presentations or all of the alternate presentations may be associated with different games than the base game. A game may include zero, one, two, or a plurality of alternate presentations associated with an outcome in the game.

In one embodiment, a probability of being selected by the processor and presented on the display device is associated with each of the presentations associated with each outcome in a game. In a game, the gaming device selects one of the presentations such as the default presentation or an alternate presentation, if available, to present a particular outcome in the game based on the probabilities. The probabilities may be the same, a plurality of the probabilities may be different, or all the probabilities may be different. In one embodiment, the probability associated with the default presentation for each outcome is greater than the probabilities associated with the alternate presentation or alternate presentations for that outcome, if any. In another embodiment, the probability associated with the default presentation for each outcome is less than the probabilities associated with the alternate presentation or alternate presentations for that outcome, if any.

In one example, a gaming device includes a card game such as a video draw poker game in which the gaming device deals cards to a player from a conventional fifty-two card deck. Initially, the gaming device pre-determines a winning card combination to provide to the player in the game such as three-of-a-kind. The gaming device then deals a first draw of the cards to the player from the deck to form the player's hand and enables the player to hold none of the cards, at least one of the cards, or all of the cards in the hand. The gaming device then determines or selects one of the presentations associated with the winning card combination including three-of-a-kind based on probabilities associated with the presentations. In this example, the combination including three-of-a-kind includes a default presentation and one alternate presentation. If the gaming device selects the default presentation, the gaming device replaces the non-held cards in the hand with randomly selected cards from the remaining cards in the fifty-two card deck. The cards are selected and presented to the player in the typical or conventional manner associated with this game. Thus, the gaming device deals the cards to the player to replace the non-held cards. If the gaming device selects the alternate presentation, the gaming device selects and presents the cards in the hand using a presentation that is different from the default presentation. In this example, the alternate presentation enables the player to pick masked selections from a plurality of masked selections to replace the non-held cards in the hand. The gaming device associates the cards that form the winning hand of three-of-a-kind with the selections picked by the player to ensure that the player obtains three-of-a-kind in the game. The gaming device then provides the player with an outcome such as an award based on the winning card combination indicated in the game.

The presentations and specifically the alternate presentations enable the gaming device to provide different presentations of the outcomes to the player in a game. Thus, the different presentations enhance the variety associated with the game and thereby increase a player's excitement and enjoyment of the game. In addition, the different presentations are associated with winning and non-winning outcomes in a game. Therefore, the gaming device does not always provide a winning outcome to a player when an alternate game presentation is presented to a player. This provides additional excitement and enjoyment to the player because the player does not know when they will obtain a winning outcome in the game.

It is therefore an advantage of the present invention to provide a gaming device and method of operating the gaming device which includes a game having a plurality of different presentations which are provided to a player to enhance the variety of the game.

Another advantage of the present invention is to provide a gaming device and method of operating the gaming device which includes a game having a plurality of different presentations which are associated with at least one different game.

Another advantage of the present invention is to provide a gaming device and method of operating the gaming device which includes a game having a plurality of different presentations wherein the presentations are associated with winning outcomes and non-winning outcomes in the game.

Additional features and advantages are described herein, and will be apparent from, the following Detailed Description and the figures.

BRIEF DESCRIPTION OF THE FIGURES

FIG. 3B is a schematic diagram of an award table associated with the embodiment of FIG. 3A.

DETAILED DESCRIPTION

Gaming Device and Electronics

Figure 1A:
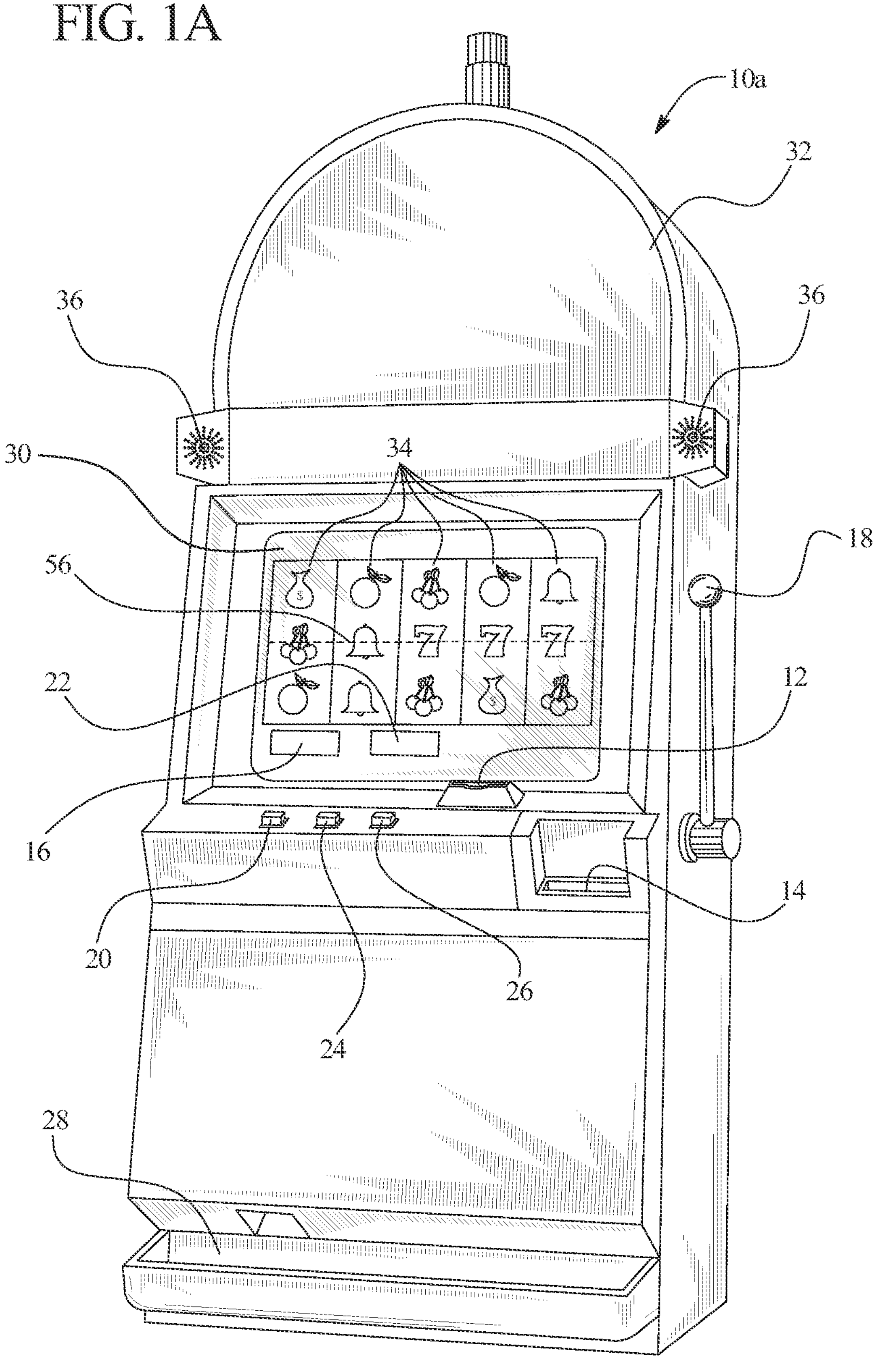
FIG. 1A is a front perspective view of one embodiment of the gaming device of the present invention.
Figure 1B:
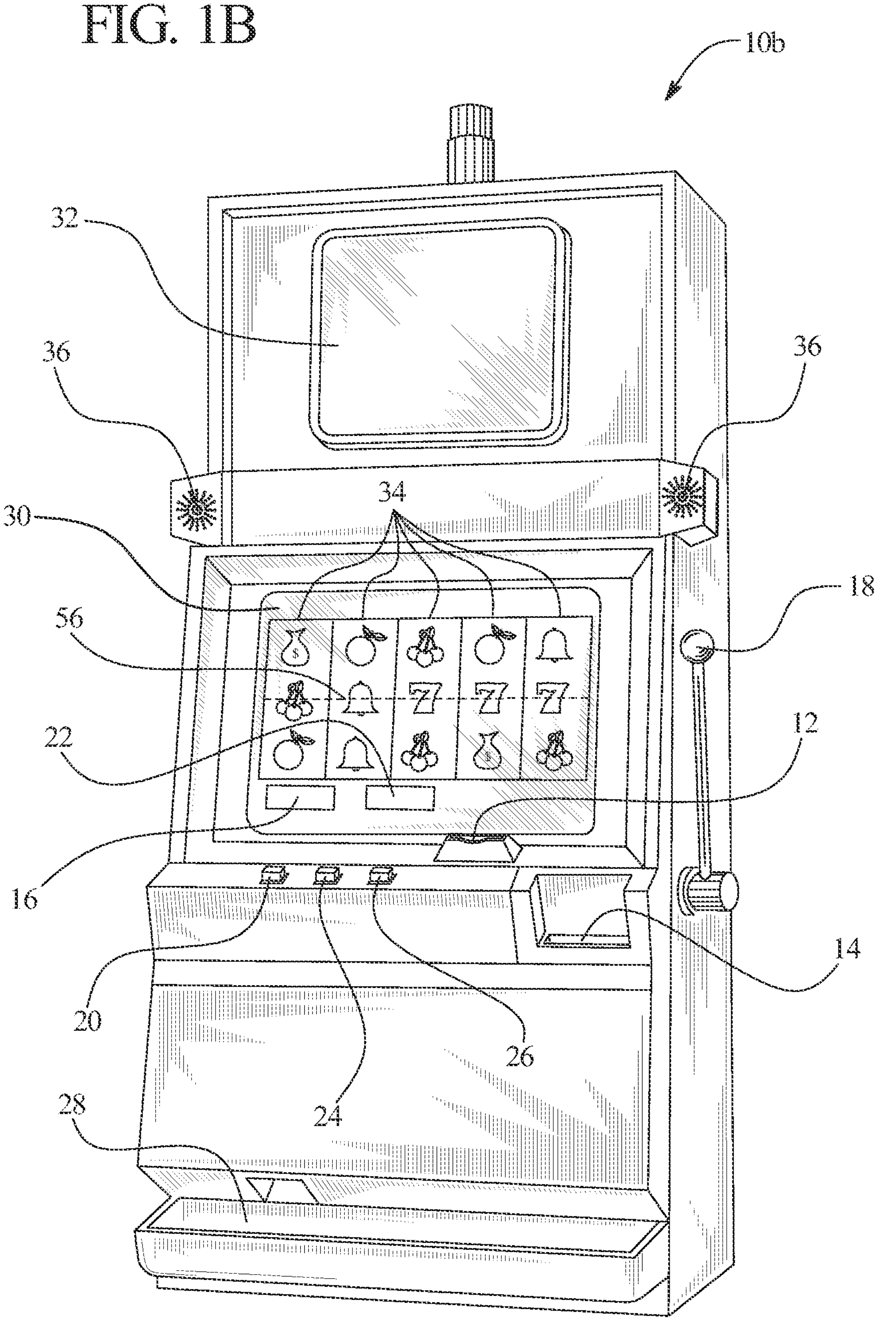
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 in one embodiment has the controls, displays and features of a conventional slot machine. It is constructed so that a player can operate it while standing or sitting, and gaming device 10 is preferably mounted in a cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker, blackjack or keno, and any of the bonus triggering events and bonus games associated with these primary games. The symbols and indicia used on and in gaming device 10 may be in mechanical electrical electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. Other bet or wager indicators such as a bet max button may also be employed in the gaming device of present invention.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, an upper display device 32, and the alternative embodiment shown in FIG. 1B includes a central display device 30 as well as an upper display device 32. Gaming device 10 in one embodiment displays a plurality of reels 34 such as three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for producing sounds such as music.

Figure 2:
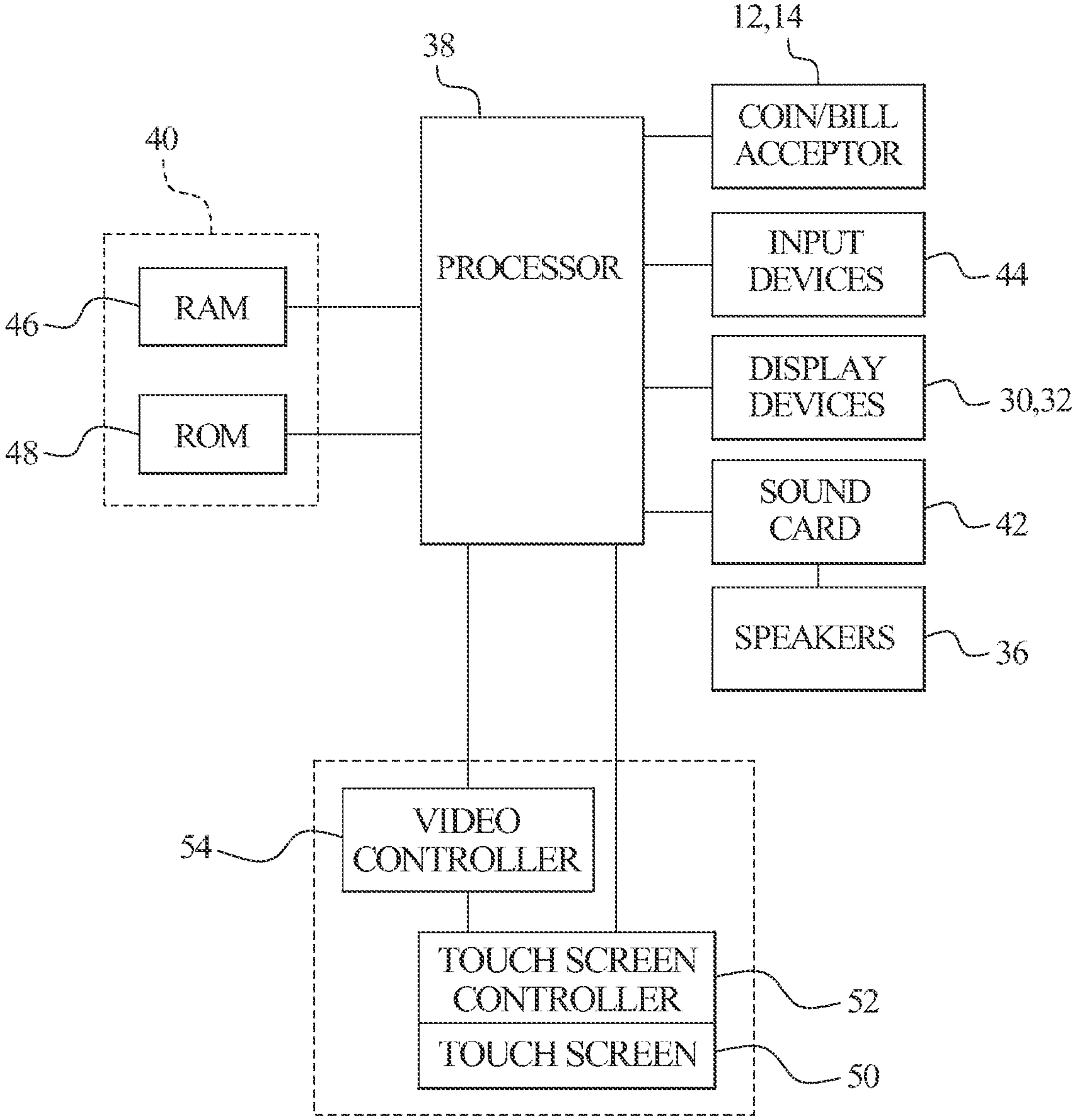
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. One or more secondary processors may also be employed in conjunction with the primary processor to control certain aspects of the game function. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10, in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, in one embodiment gaming device 10 also gives players the opportunity to win credits in a bonus round. This type of gaming device 10 will include a program which will automatically begins a bonus round when the player has achieved a qualifying condition in the game. This qualifying condition can be a particular arrangement of indicia on a display device. The gaming device 10 may use mechanical devices or a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Alternate Outcome Presentations

One embodiment of the present invention is directed to a gaming device and a method of playing a gaming device including a game having a plurality of presentations or displays of winning and non-winning combinations in a game wherein a default presentation is associated with each of the combinations and at least one alternate presentation is associated with at least one of the combinations.

In one embodiment, the gaming device displays a primary or base game including a card game, a reel game, or any suitable type of game to a player. The gaming device then enables the player to play the base game. If the player obtains a winning outcome or combination in the game, the gaming device displays the presentation of the winning outcome to the player. Similarly, if the player obtains a losing outcome or non-winning outcome in the game, the gaming device displays the presentation of the non-winning outcome to the player. In this embodiment, one or more presentations or displays are associated with each outcome in a game. A default presentation is associated with each of the outcomes in the game and at least one alternate presentation is associated with at least one of the outcomes in the game. The default presentations include the standard or typical presentation of an outcome, and the alternate presentations include presentations or displays of the outcome that are different than the default presentation for the outcome.

The alternate presentations add variety to a game by providing one or more different presentations or displays in a game to a player. In one embodiment, at least two of the alternate presentations are different. In another embodiment, a plurality of the alternate presentations are different. In a further embodiment, all of the alternate presentations are different. Additionally, the alternate presentations may include different presentations such as displaying playing cards in a card game in different locations on a display device or such as displaying a video and mechanical format of the cards on the display device. It should be appreciated that zero, one, two, or a plurality of alternate presentations may be associated with an outcome in a game.

In one embodiment, a probability of being selected by the processor and displayed on the display device is associated with each of the presentations associated with each outcome in a game. In a game, the gaming device selects a presentation (i.e., a default presentation or an alternate presentation) to present or display a particular outcome in the game based on the probabilities. The probabilities may be the same, a plurality of the probabilities may be different, or all the probabilities may be different. In one embodiment, the probability associated with the default presentation for each outcome is greater than the probabilities associated with the alternate presentation or alternate presentations for that outcome, if any. In another embodiment, the probability associated with the default presentation for each outcome is less than the probabilities associated with the alternate presentation or alternate presentations for that outcome, if any. It should be appreciated that the default and alternate game presentations may be associated with the outcomes in a primary or base wagering game, a secondary or bonus game triggered from a wagering game or any other suitable game.

As described above, the alternate presentations enable the gaming device to provide different presentations of the outcomes to the player in a game, which adds variety to the game and increases the excitement and enjoyment of the game. The alternate presentations also provide the player with the illusion that the player's actions in the alternate presentations are determining the outcomes or combinations in the game. This adds additional excitement and enjoyment of the game.

Figure 3A:
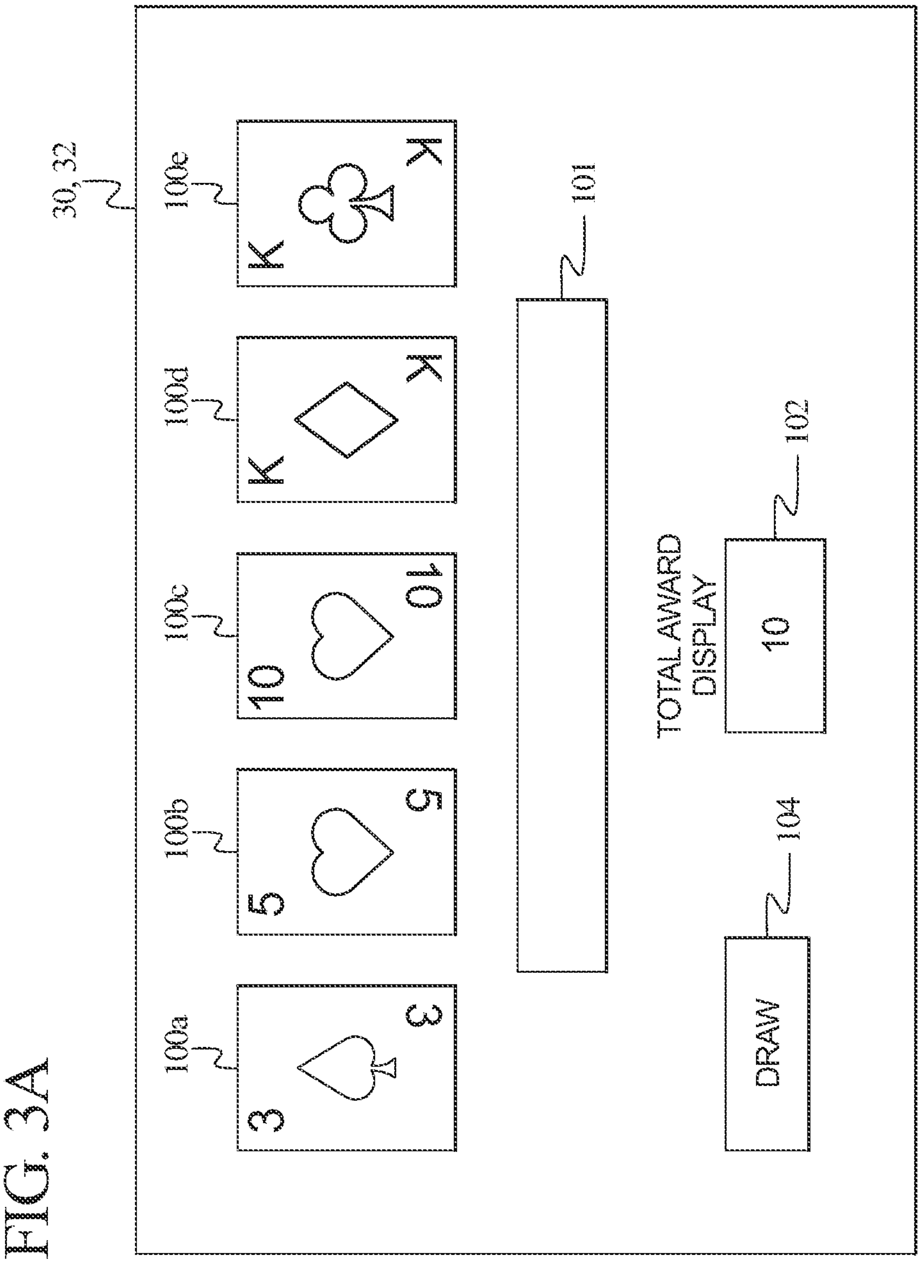
FIG. 3A is an enlarged front elevation view of one embodiment of the present invention illustrating a card game including alternate presentations.

Referring now to FIGS. 3A and 3B, one embodiment of the present invention is illustrated where the present invention is employed in a base wagering game and particularly a video draw poker card game. In the game, the gaming device displays the player's hand on a display device such as display device 30 or 32, by forming the hand from an initial or first draw of virtual cards from a conventional deck of fifty-two cards. As shown in FIG. 3A, the player's hand includes cards 100*a*, 100*b*, 100*c*, 100*d*, and 100*e* which include the three of spades, the five of hearts, the ten of hearts, the king of diamonds, and the king of clubs, respectively. The gaming device also includes an instruction display 101, which indicates or prompts the player to perform one or more actions during the course of the game, indicates to the player whether the player has obtained a winning outcome, losing outcome or non-winning outcome in the game or any other suitable instruction or prompt associated with the game.

The gaming device further includes a draw button or input 104 which enables the player to press or activate the button to obtain one or more draws in the game up to a designated number of draws for the game after the player selects one or more cards to hold in the player's hand as discussed below. Alternatively, the player may press the play button 20 to receive another draw of cards in the game as shown in FIGS. 1A and 1B. The gaming device also includes a total award display 102, which indicates the total award accumulated by the player in the game.

An award table 103 shown in FIG. 3B is associated with the embodiment of FIG. 3A and includes a first column 104 which includes a plurality of different outcomes or combinations of the cards that can be displayed in the game. The various outcomes include winning outcomes or winning combinations such as a royal flush, a straight flush, four-of-a-kind, a full house, a flush, a straight, three-of-a-kind, two pair or a pair including two jacks or two cards of greater value than two jacks; and losing outcomes or combinations, or non-winning outcomes or combinations which include all other hands that do not provide winning outcomes in the game.

Column 106 in the award table 103 includes the different types of presentations associated with each of the winning outcomes and the losing or non-winning outcomes in the game. For example, a winning combination of cards or winning outcome including four-of-a-kind has three different types of presentations or displays that may be selected and presented or displayed by the processor to the player in a game. One presentation is a default presentation, which is the typical or normal presentation of this winning outcome in the game. The winning combination including four-of-a-kind also includes two alternate presentations alternate #1 and alternate #2. The alternate presentations may be any suitable presentation or display of the outcome where at least two of the alternate presentations are different, a plurality of the alternate presentations are different or all of the alternate presentations are different. For example, one alternate presentation associated with an outcome in a game presents or displays a reel type or slot game to the player and the other alternate presentation presents or displays a dice game to the player.

Column 108 includes the probabilities associated with each of the different presentations wherein the probability is the probability that the processor will select and present or display each of those different presentations in the game for that outcome. For example, the probability that the default presentation will be selected and presented by the processor when a winning outcome including four-of-a-kind is obtained by the player in the game is fifty percent (50%). The probability associated with alternate presentation #1 is thirty percent (30%) and the probability associated with alternate presentation #2 is twenty percent (20%). Therefore, upon the occurrence of the outcome or combination, the processor is more likely to pick and present the default presentation over alternate presentations #1 or #2 based on the probabilities.

Column 110 in the award table 103 includes the awards associated with each of the winning combinations or outcomes and with the non-winning combination or outcome in the game. Although only one non-winning outcome is included in the game, it should be appreciated that any suitable number of non-winning outcomes may be displayed in a game.

Referring to FIGS. 4A to 4K, an example of the embodiment of FIGS. 3A and 3B is illustrated where the present invention is employed in a card game and specifically in a five card draw video poker game. In this game, the gaming device randomly draws five cards from a conventional deck of fifty-two virtual playing cards (not shown). The gaming device displays the five cards on the display device 30 or 32. The five cards provided to the player in this game for the player's hand include cards 200*a*, 200*b*, 200*c*, 200*d* and 200*e*, which include the four of diamonds, the jack of hearts, the jack of clubs, the five of diamonds, and the eight of spades, respectively. The gaming device also displays an instruction display or prompt 201 which instructs the player to perform some action during the game or indicates when the player has obtained a winning outcome, a non-winning outcome, or any other outcome associated with the game. A draw button 204 is also displayed by the display device and enables the player to obtain one or more draws of the remaining cards in the deck of fifty-two cards during the game after the player has held zero, one, two or more of the cards in the hand. Also, an award display 202 indicates the total outcome or award accumulated by the player in the game.

Figure 4A:
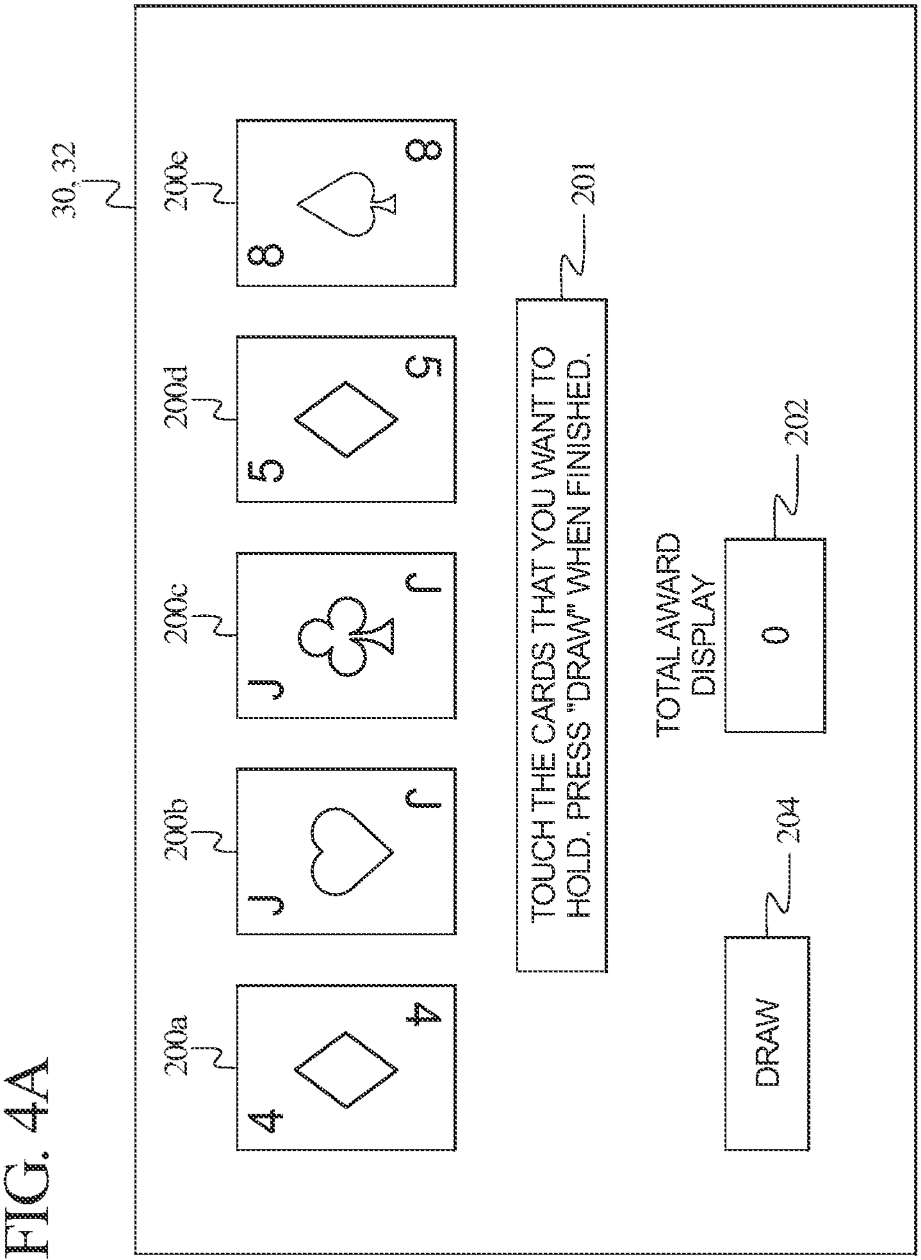
FIGS. 4A to 4K are enlarged front elevation views of an example of the embodiment in FIGS. 3A and 33 illustrating a presentation of a winning outcome in a game.

In FIG. 4A, the gaming device instructs the player to touch the cards that the player wants to hold or keep in their hand and then press the draw button 204 when finished as indicated by the instruction display 201. The player must now determine which cards the player wants to hold or keep in their hand and which cards the player wants to replace with different cards from the deck of fifty-two cards. It should be appreciated that the non-held cards in this embodiment are replaced with cards selected from the remaining cards in the deck, however, the replacement cards may replace the non-held cards, be displayed adjacent to the non-held cards, or displayed in any suitable display associated with the cards in the hand.

Figure 4B:
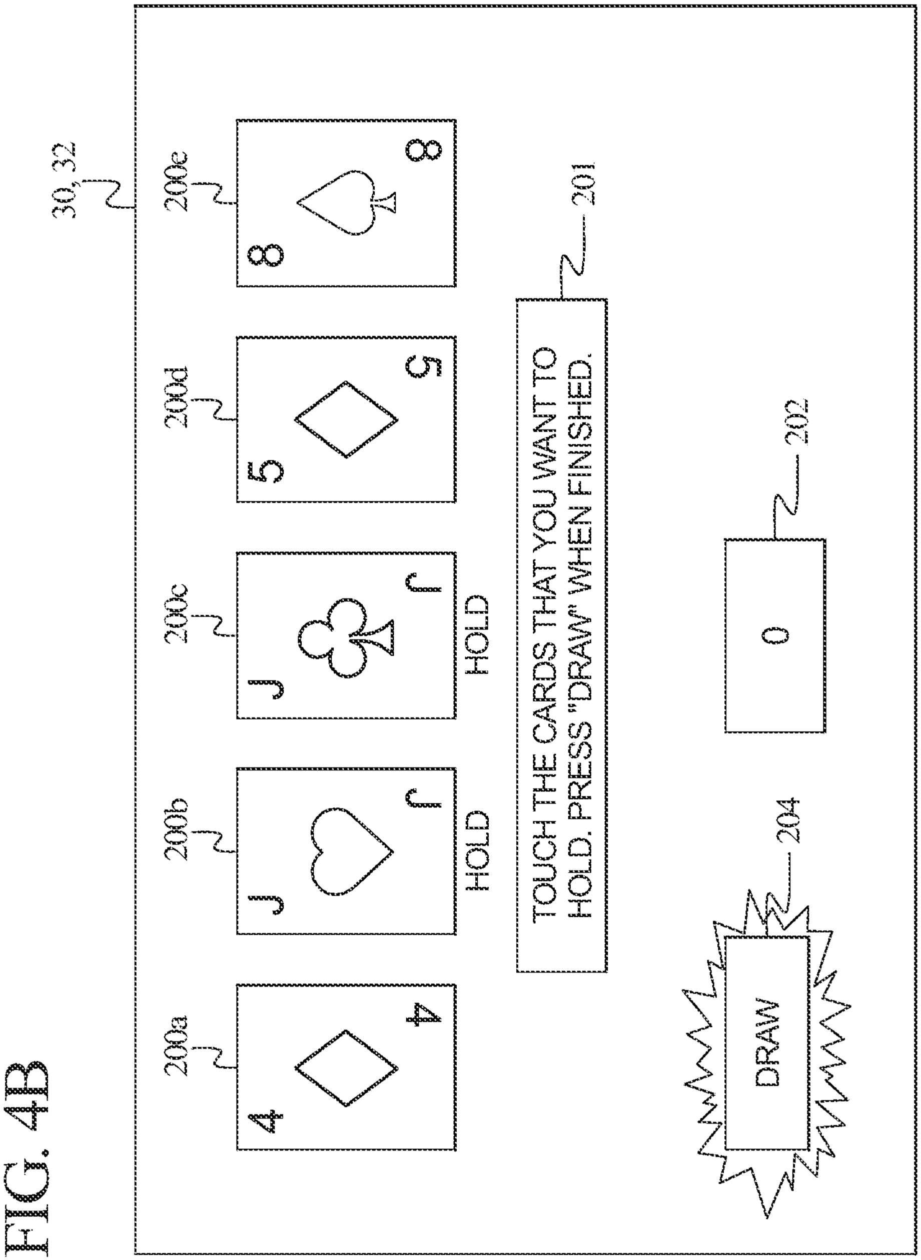

Referring to FIG. 4B, the player decides to hold or keep cards 200*b* and 200*c* (as indicated by the word "HOLD" displayed underneath each of the cards), which include the jack of hearts and the jack of clubs, respectively, and replace cards 200*a*, 200*d*, and 200*e* with new cards selected from the remaining cards in the deck of fifty-two cards. The player touches or presses cards 200*b* and 200*c* to hold those cards and then presses the draw button 204 to receive another draw of the cards in the game. Because the player held the cards including the two jacks, the gaming device now determines or designates an outcome to provide to the player in the game. As shown in FIG. 3B, the two jacks already form a winning outcome or winning combination of cards including at least one pair. In this example, the gaming device selects the winning combination of four-of-a-kind to provide to the player in the game. As a result, the winning combination or winning outcome in the game will include four cards having a jack to provide the winning outcome or combination of four-of-a-kind. It should be appreciated that the processor may predetermine the outcome in the game, randomly determine the outcome, or determine the outcome in any suitable manner.

In the game, the player holds the jack of hearts card 200*b* and the jack of clubs card 200*c*. Therefore, the gaming device will present or display the two remaining jacks, specifically the jack of spades and the jack of diamonds to the player, to complete the pre-determined winning outcome of four-of-a-kind. As shown in FIG. 3B, a winning outcome including four-of-a-kind has three different types of presentations which the processor may select and use to present or display the determined outcome to the player. The presentations include a default presentation, which has a probability of 50%, an alternate presentation #1, which has a probability of 30%, and an alternate presentation #2, which has a probability of 20%. Therefore, the default presentation is the most likely or probable presentation to be selected by the processor and used to present the winning outcome of four-of-a-kind in this game to the player. Similarly, the alternate presentation #2 is the least likely of the presentations to be used to present the winning outcome of four-of-a-kind based on the probability associated with this presentation.

Figure 4C:
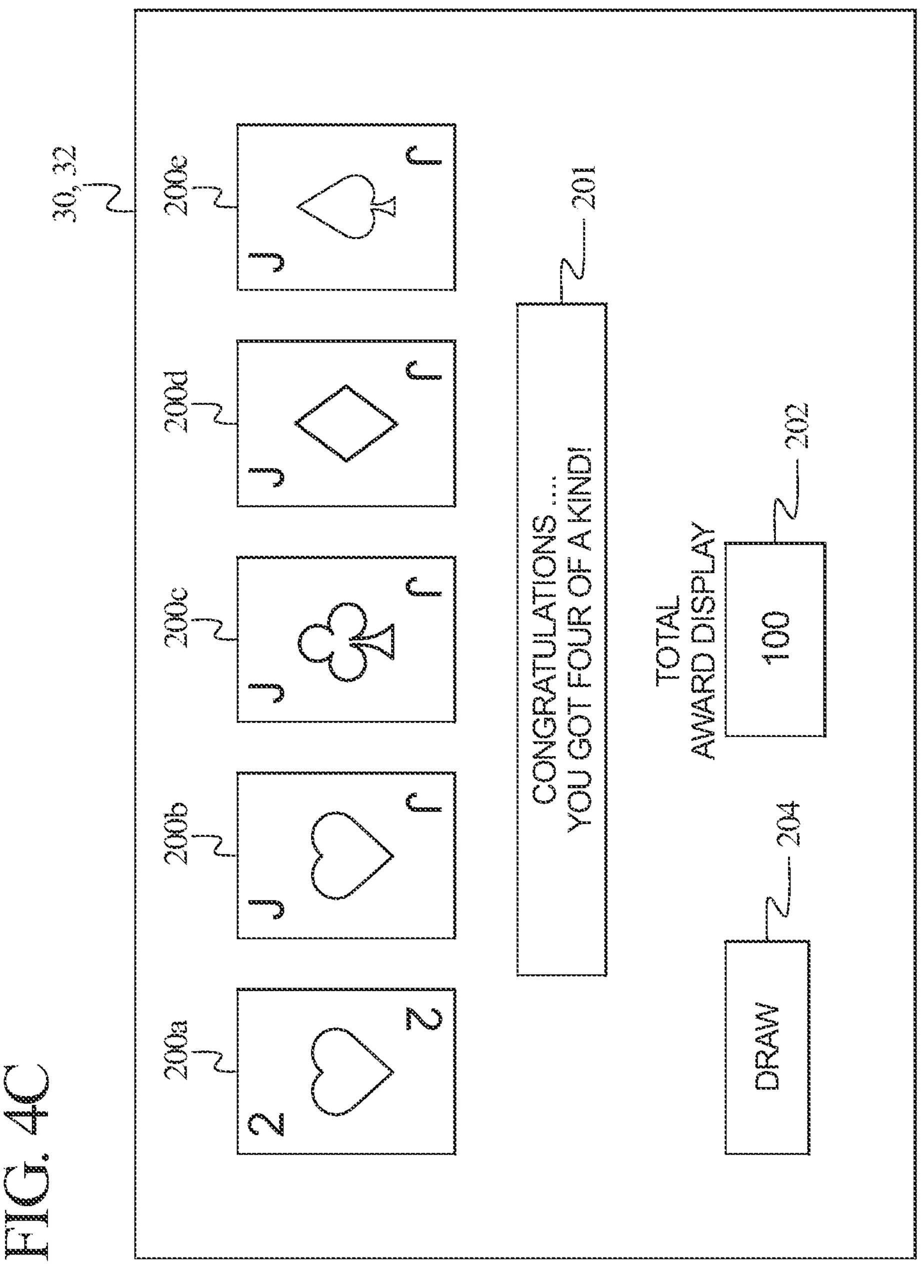

Referring to FIG. 4C, the default or typical presentation simply involves displaying the cards to the player in the typical or normal manner in the video draw poker card game. The processor therefore replaces the non held cards in the hand with three different cards from the remaining cards in the deck of fifty-two cards and presents or displays those cards to the player when the processor chooses the default display based on the probabilities shown in the award table 103 in FIG. 3B. The replacement cards include the remaining two jacks which completes the outcome of four-of-a-kind as illustrated in FIG. 4C.

Alternate presentation #1 includes a different presentation of the cards, which provides and presents or displays the cards differently from the default presentation. Alternate presentation #1 or alternate #1 provides a presentation of the cards, which enables the player to pick the cards to replace the non-held cards in the hand from a plurality of selections. The gaming device predetermines which cards from the remaining cards in the deck of fifty-two cards will be associated with the selections picked by the player. The cards associated with the selections by the gaming device are then transferred from the selection game to the card game (i.e., base game) and replace the non-held cards in the player's hand.

Figure 4D:
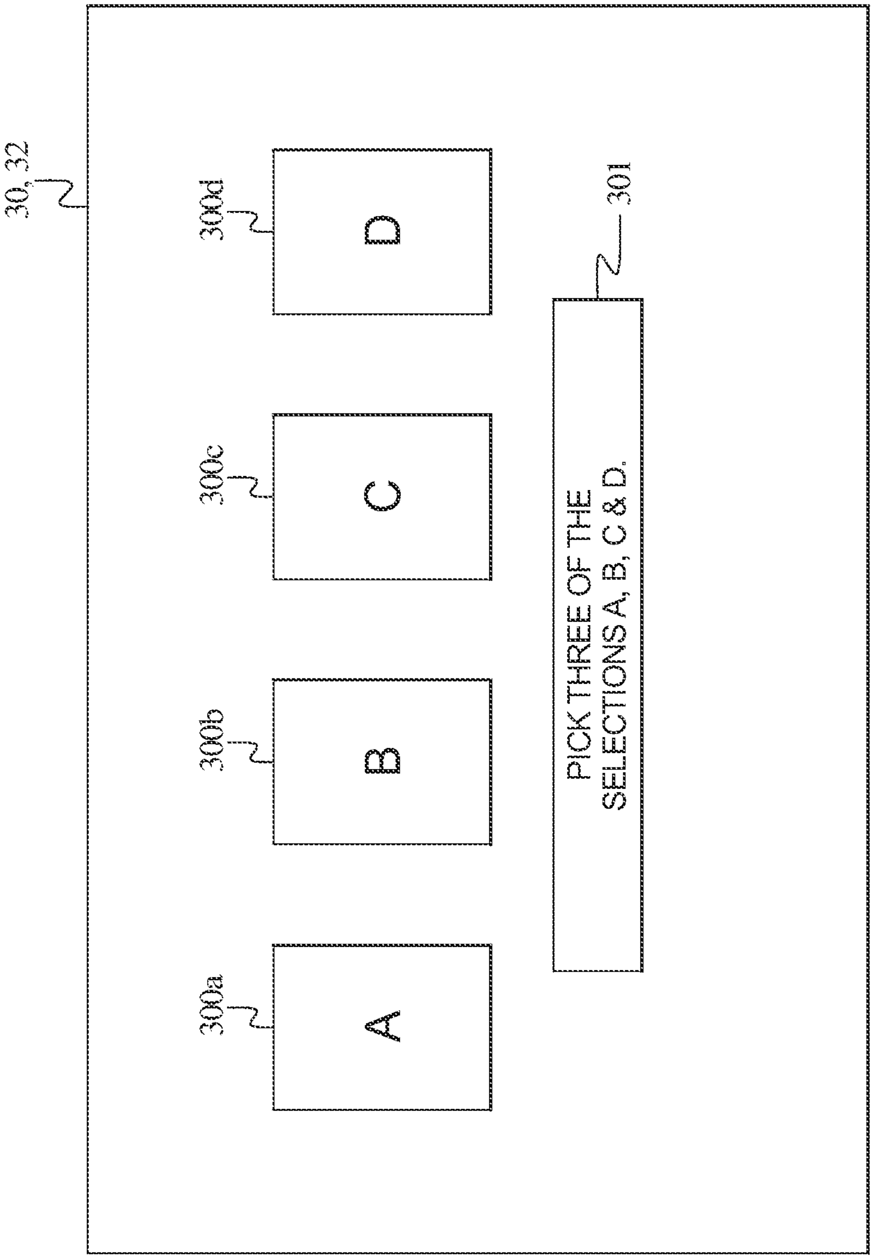

For example, referring now to FIG. 4D, the gaming device selects and presents alternate presentation #1 or alternate #1. Specifically, alternate presentation #1 includes four masked or hidden selections 300*a*, 300*b*, 300*c*, and 300*d*. The game includes a prompt or instruction presentation 301 which prompts the player to pick three out of the four selections to replace the three cards not held in the base game. The gaming device pre-determines the card or cards to associate with the picked selection or selections by the player. In one embodiment, alternate game presentation #1 replaces the first game presentation on the same display device until the game associated with the alternate game presentation #1 is completed. In another embodiment, the alternate game presentation #1 or alternate presentation #1 is presented on a separate display device. The alternate game presentation #1 presents the same cards as the default presentation shown in FIG. 4C, but in an alternate or different way.

Figure 4E:
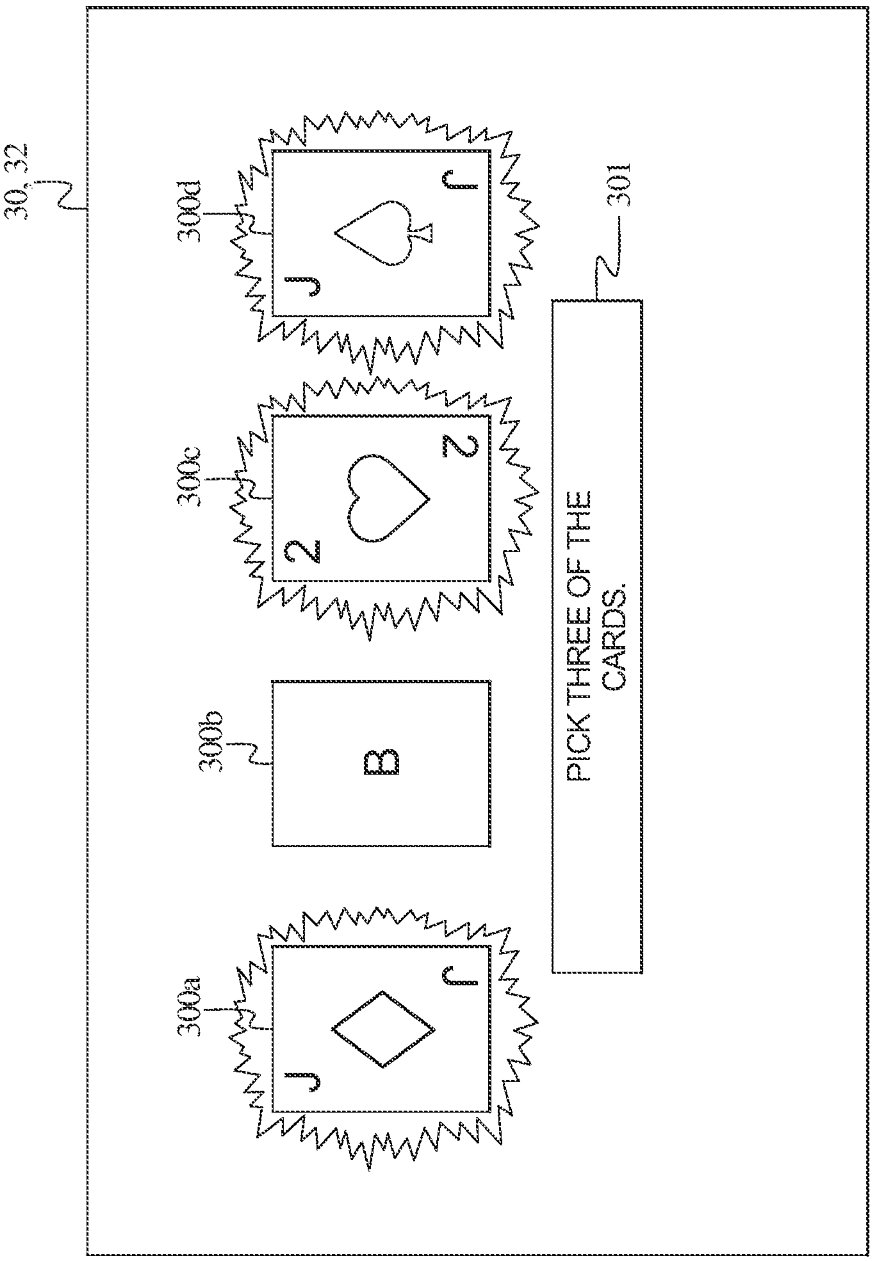

Referring to FIG. 4E, the player picks selections 300*a*, 300*c*, and 300*d*. The gaming device then associates cards selected from the remaining cards in the fifty-two card deck with the picked selections. In this example, the gaming device associated cards including the jack of diamonds, the six of hearts, and the jack of spades, respectively, with the selections picked by the player. The gaming device predetermined the winning outcome provided to the player in the game. It should be appreciated that the winning outcome in a game may be predetermined, randomly determined, or determined in any suitable manner. In this example, the gaming device predetermines and associates the two remaining cards needed to complete the winning outcome (i.e., the two jacks) with the two selections picked by the player from the three possible selections. After the player picks and reveals the cards associated with the selections in alternate presentation #1 shown in FIG. 4E, the gaming device returns the player to the original or base game presentation or display.

Figure 4F:
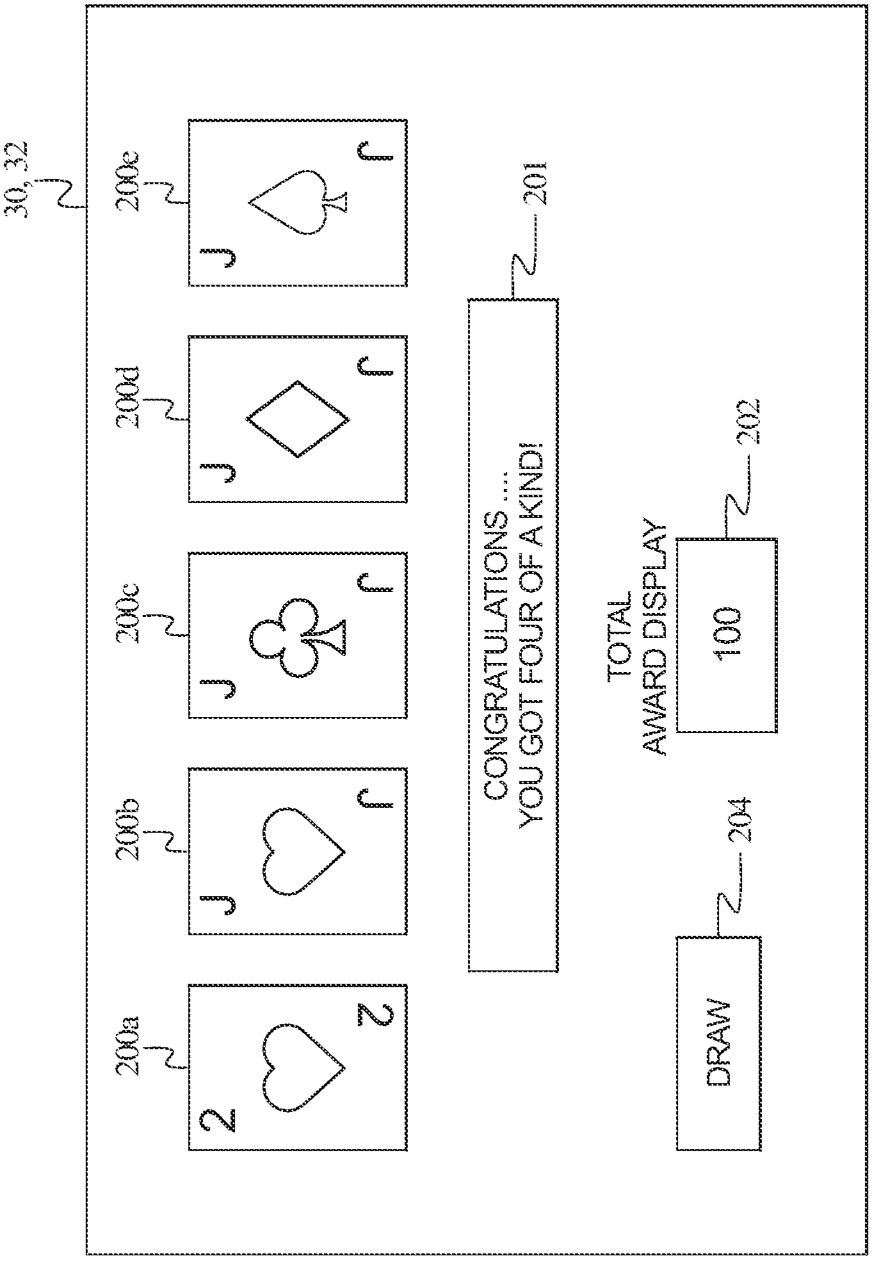

Referring to FIG. 4F, the gaming device replaces the cards that were not held by the player in the player's hand with the cards associated with the selections picked by the player in the alternate presentation #1. The player's hand now includes cards 200*a*, 200*b*, 200*c*, 200*d*, and 200*e* which include the two of hearts, the jack of hearts, the jack of clubs, the jack of diamonds, and the jack of spades, respectively. Additionally, the gaming device indicates to the player that the player has obtained the winning outcome of four-of-a-kind in the game. Thus, the alternate presentation provides the same outcome to the player as the default presentation shown in FIG. 4C, but in a different way. This different way is interactive, although it should be appreciated that the alternative display does not need to be interactive. As shown in FIG. 3B, an award of one hundred is associated with the winning outcome of four-of-a-kind and the award of one hundred is indicated in the total award presentation 202. Thus, the gaming device presented the winning outcome of four of a kind in an alternate or different way using alternate presentation #1 to increase the variety of presentations presented to the player and create the illusion that the player is determining the outcome in the game, which increases the player's excitement and enjoyment of the game.

Alternate presentation #2 or alternate #2 provides another different presentation of the cards to the player. This presentation includes a wheel in which the gaming device provides the player with a number of spins equal to the number of cards that have not been held by the player in the player's hand in the base game. The gaming device pre-determines the cards that will be indicated in each spin. The gaming device then enables the player to spin the wheel to indicate the pre-determined cards to replace the non-held cards in the player's hand. Thus, the gaming device picks one of these presentations to present or display the non-held cards to the player.

Figure 4G:
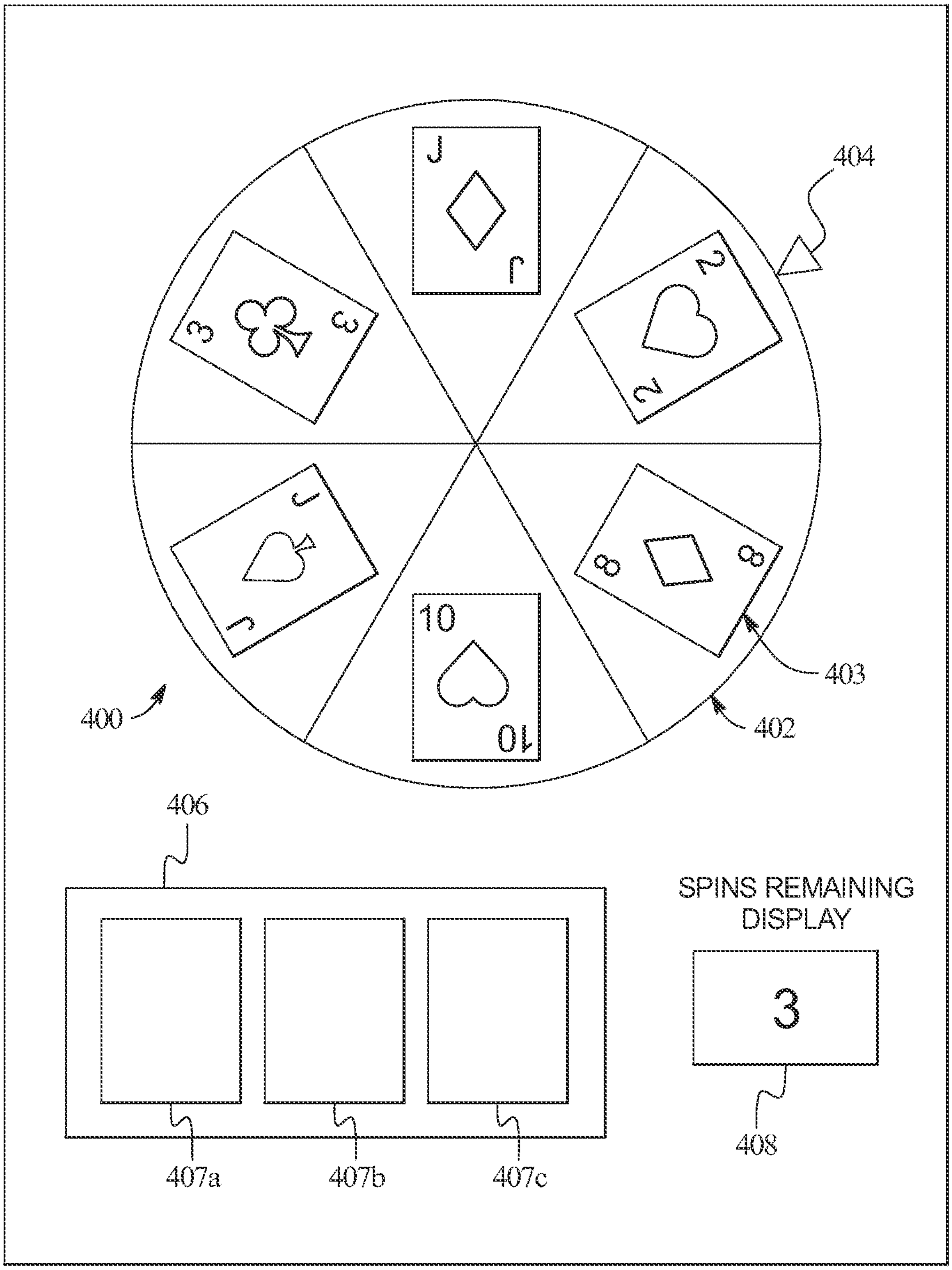

For example, referring now to FIG. 4G, alternate game presentation #2 or alternate #2 is shown where this display includes a wheel 400 which includes a plurality of cards that replace the non-held cards in the player's hand shown in FIG. 4B. Specifically, the wheel 400 includes a plurality of sections 402 where each section includes a card. An indicator or section indicator 404 indicates one of the sections on the wheel. The gaming device then provides the card associated with the section indicated by the section indicator 404 to the player. Any cards associated with indicated sections on wheel 400 are transferred and displayed in the card display 406. In this example, the gaming device enables the player to spin the wheel 400 to obtain three cards from the six cards included in the sections on the wheel to replace the non-held cards in the player's hand shown in FIG. 4B. It should be appreciated that the sections on the wheel may include a plurality of the remaining cards in the deck or all of the remaining cards in the deck. The card display 406 includes three card locations 407*a*, 407*b*, and 407*c* to display the cards indicated on the wheel. The gaming device also includes a spins remaining display 408 which indicates the number of spins remaining in the game associated with alternate presentation #2. In one embodiment the number of spins equals the number of cards that were not held in the player's hand. It should be appreciated that the number of spins may be any suitable number of spins.

Figure 4H:
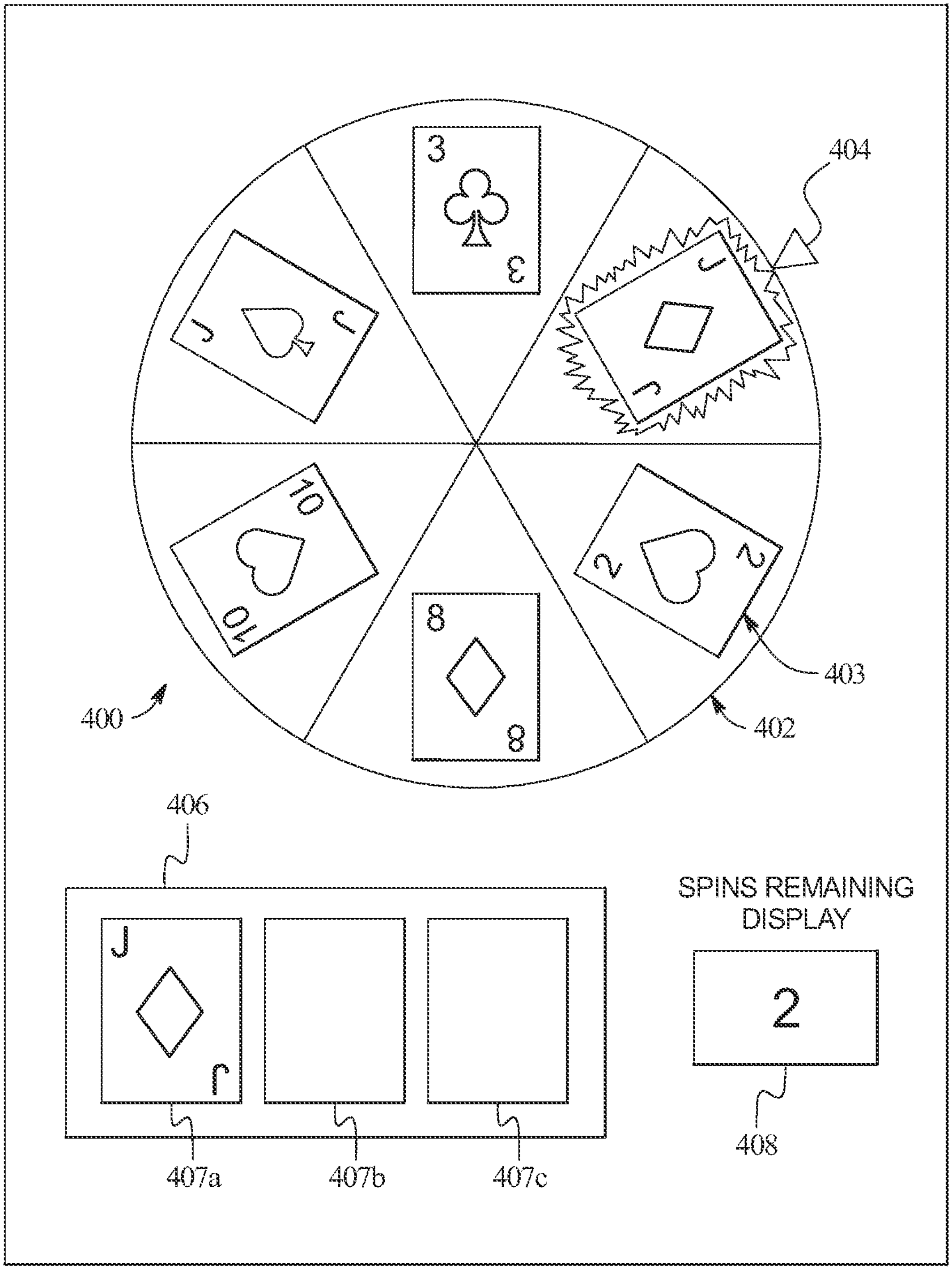

Referring to FIG. 4H, the player spins the wheel 400 for the first time in the game associated with the alternate game presentation #2. The section indicator 404 indicates a section including the jack of diamonds (which was pre-determined by the gaming device to be indicated in the spin), where the card is then transferred to card location 407*a* in card display 406. The player now has two spins remaining in the game as indicated by the spins remaining display 408. As described above, the gaming device predetermined the winning outcome in the base game to be four-of-a-kind. Therefore, the gaming device will cause the wheel to indicate the two sections including the cards having the jack of diamonds and the jack of spades to complete that winning outcome. However, the player does not know that the winning outcome has been pre-determined and therefore the player does not know which cards will be indicated in this game. This causes the player's level of excitement and enjoyment to increase in the game because the alternate presentation creates the illusion that the player's actions determines the outcome in the game.

Figure 4I:
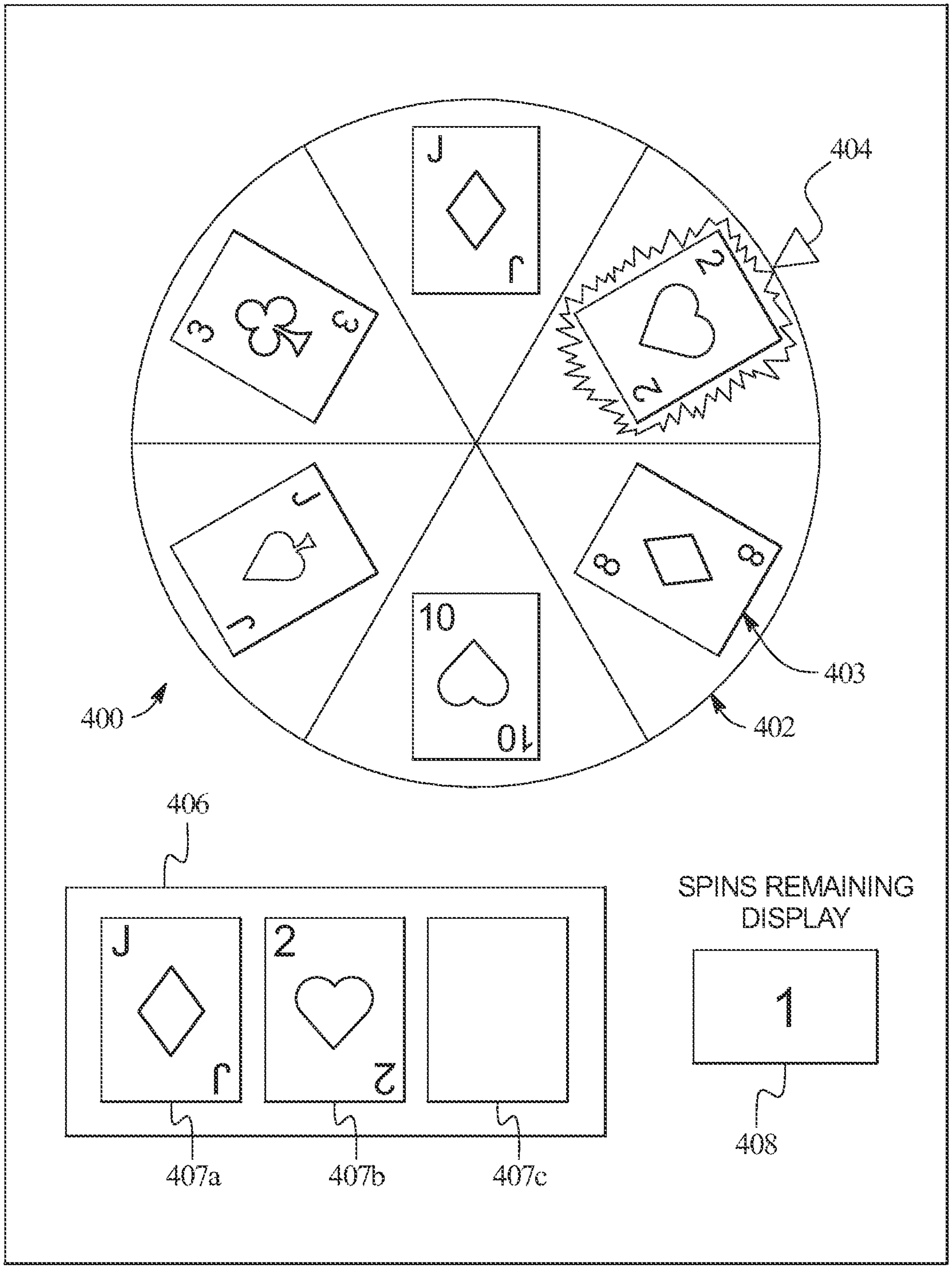

Referring to FIG. 4I, the gaming device or the player spins the wheel 400 for a second time in the game. The section indicator 404 indicates a section having a card with the two of hearts. The card having the two of hearts is now transferred to card location 407*b* in the card display 406. The player now has a winning outcome or winning card combination including three-of-a-kind (i.e., three jacks). The player has one spin remaining in the game as indicated by the spins remaining display 408.

Figure 4J:
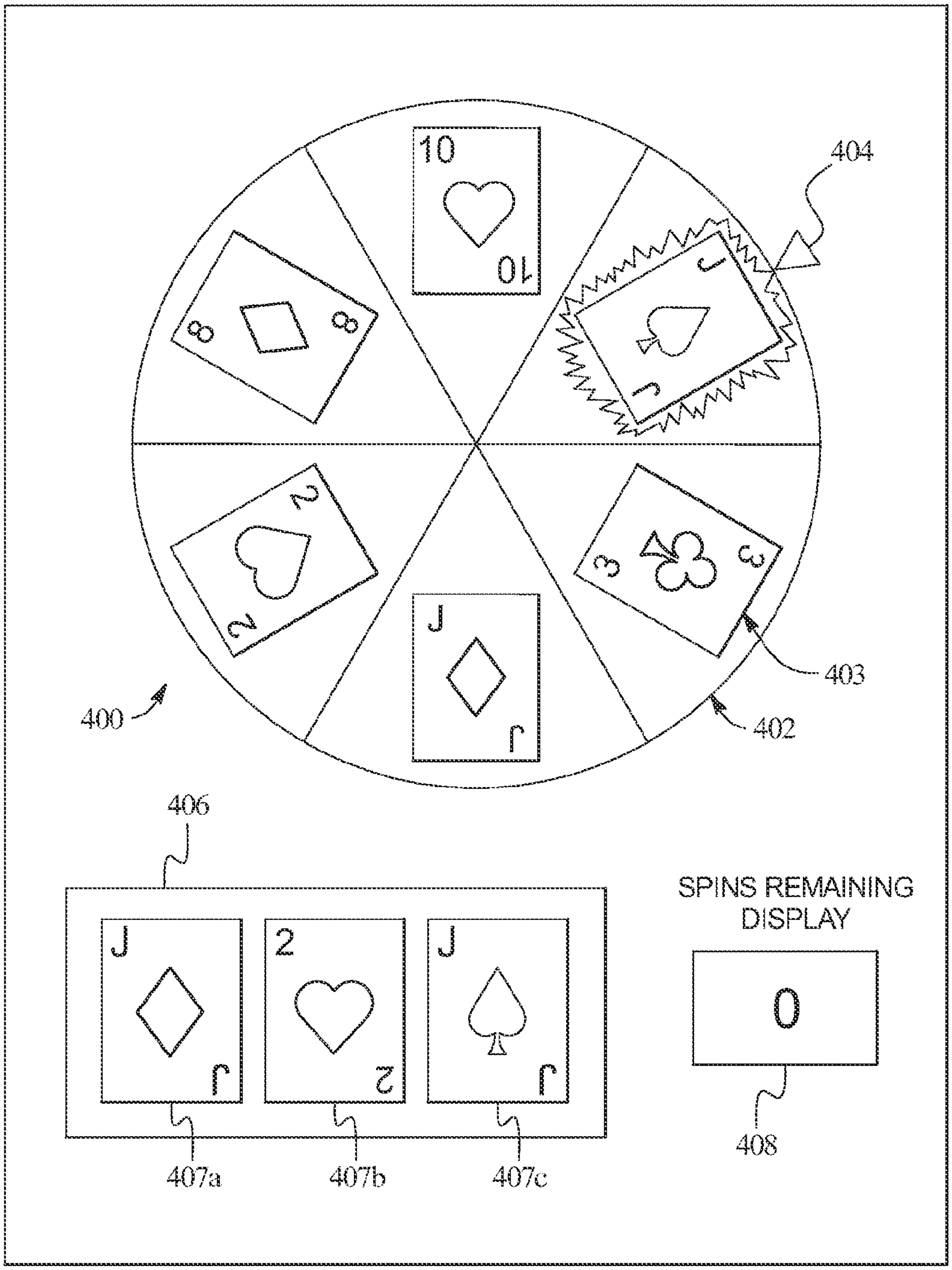

Referring to FIG. 4J, the gaming device or player spins the wheel for the final time in the game associated with the alternate game presentation #2. The gaming device determines that the jack of spades will be indicated in this spin. The wheel stops spinning and the section indicator 404 indicates the section including the jack of spades. The jack of spades is transferred to card location 407*c* in card display 406. The player does not have any spins remaining and therefore the alternate presentation ends. The gaming device then transfers the player back to the original or base game by replacing the alternate presentation #2 with the original or base game presentation or display.

Figure 4K:
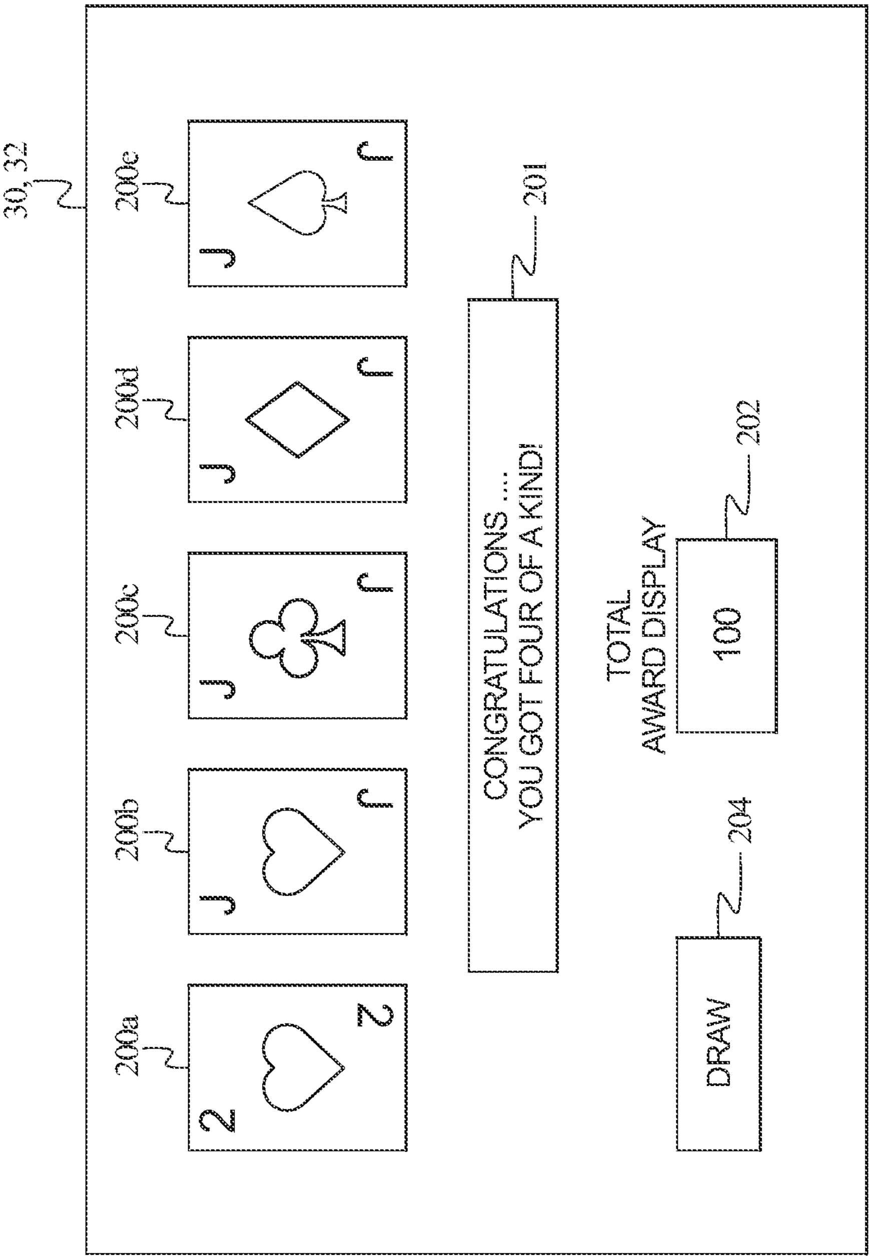

Referring to FIG. 4K, the gaming device displays the base display and replaces the non-held cards in the player's hand shown on this display with the cards obtained in the alternate game presentation #2. The player's hand now includes cards 200*a*, 200*b*, 200*c*, 200*d*, and 200*e*, which include the four of diamonds, the jack of hearts, jack of clubs, jack of diamonds, and the jack of spades, respectively, which is the same outcome as shown in FIGS. 4C and 4F. The gaming device also indicates that the player obtained a winning outcome or winning combination including four-of-a-kind as indicated by the instruction display 201. The gaming device provides the award of one hundred associated with four-of-a-kind to the player as shown in FIG. 3B. The award of one hundred is indicated by the total award display 202.

As shown in FIGS. 4A to 4K, the gaming device selects a presentation of a particular outcome such as a winning outcome in a game based on probabilities associated with those presentations. The gaming device then presents or displays the selected presentation to the player. As a result, the player may view one of several different displays associated with the outcomes in the game. This adds variety to the game and also provides the illusion that the player's actions all determining the outcome in the game, which increases the player's level of enjoyment and excitement of the game.

Figure 5A:
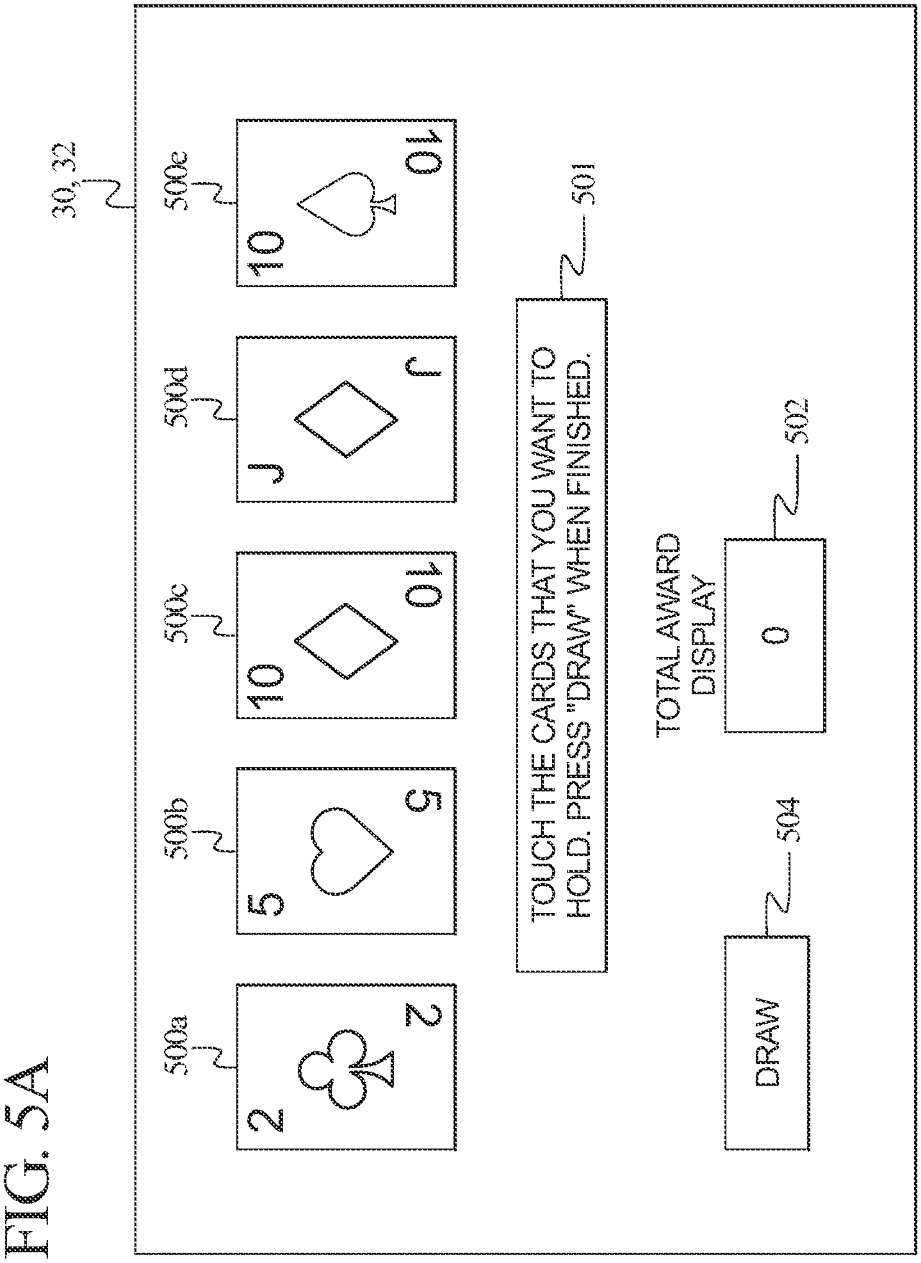
FIGS. 5A to 5H are enlarged front elevation views of the embodiment of FIGS. 3A and 3B illustrating a presentation of a losing outcome in a game.

Referring to FIGS. 3B and 5A, another example of the embodiment of FIG. 3A is illustrated where the present invention is employed in a video draw poker game where the gaming device pre-determines a non-winning outcome and provides the non-winning outcome to the player in the game. In this example, the gaming device displays five cards 500*a*, 500*b*, 500*c*, 500*d*, and 500*e* to form the player's hand. The cards 500*a*, 500*b*, 500*c*, 500*d*, and 500*e* include the two of clubs, the five of hearts, the ten of diamonds, the jack of diamonds, and the ten of spades, respectively. The gaming device also includes an instruction display 501 which indicates instructions, awards, or any other suitable prompt during the course of the game as described above. Additionally, a draw button or input 504 enables the player to obtain one or more draws from the remaining cards in a deck of fifty-two cards in the game after the player selects cards to hold in theft hand. A total award display indicates the total award accumulated by the player in the game.

In this example, the gaming device pre-determines that the player will obtain a losing outcome or non-winning outcome in the game. Therefore, the gaming device will provide the cards that form the losing outcome to the player based on the cards held by the player in the game. As shown in FIG. 33, a losing outcome or non-winning hand includes two different types of presentations. A first presentation includes the default or normal presentation, which includes a probability of 90%. The losing outcome also includes an alternate presentation, such as alternate #1, which includes a probability of 10%. Thus, the gaming device is much more likely to choose the default presentation to show the non-winning hand in the game than the alternate presentation.

Figure 5B:
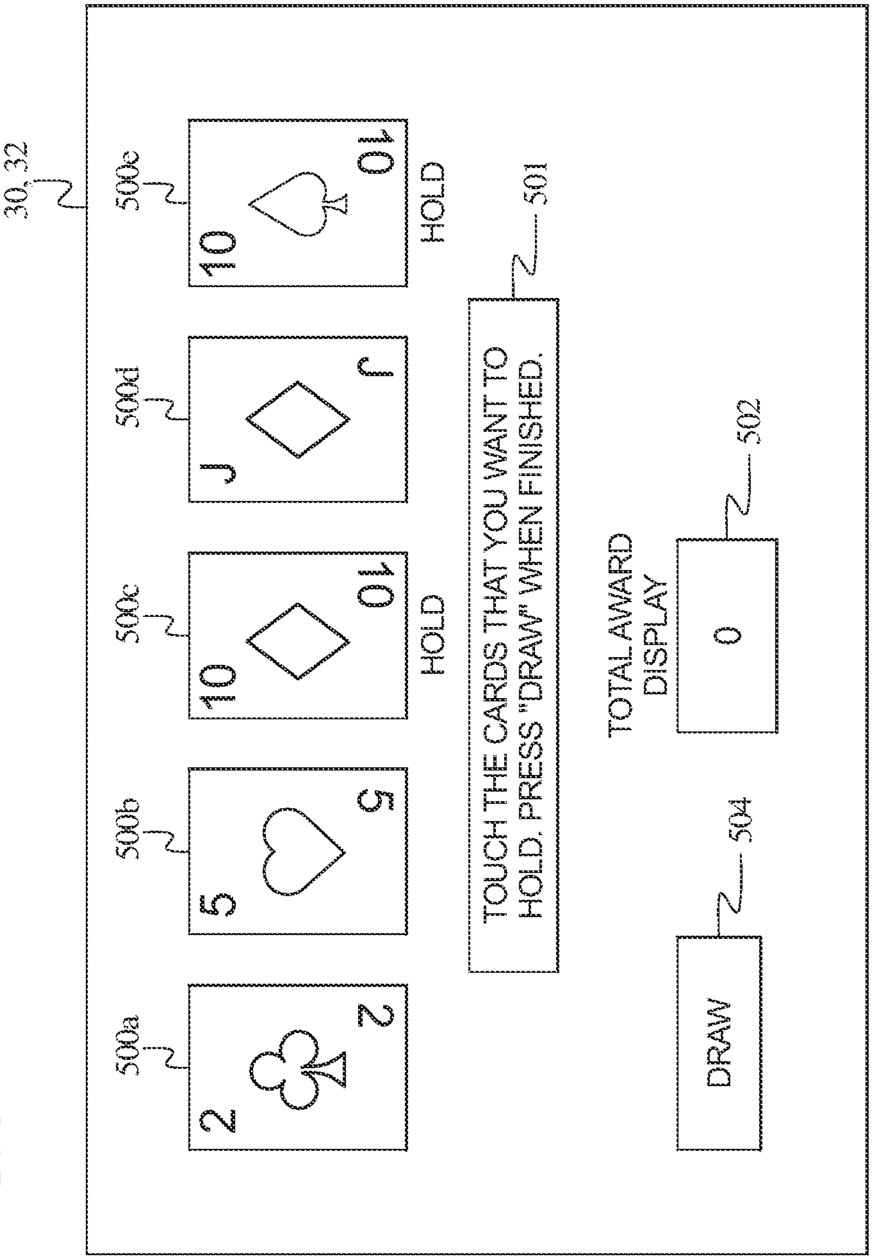

Referring to FIG. 5B, the player selects and holds cards 500*c* and 500*e* (as indicated by the word "HOLD" displayed under these cards) which include the ten of diamonds and the ten of spades, respectively. The player then presses the draw button 504 when they are finished picking the cards to hold in the hand to obtain another draw of cards from the deck. At this point in the game, the gaming device selects one of the presentations to present or display the pre-determined losing outcome based on the probabilities associated with the presentations indicated in award table 103 in FIG. 33. As shown in FIG. 33, a non-winning hand or losing outcome includes two presentations of this outcome, one presentation is the default or typical presentation and has a probability of 90% and the other is an alternate presentation, alternate #1 which has a probability of 10%. In this example, if the gaming device selects the default presentation, the gaming device replaces the non-held cards in the player's hand with different cards selected from the remaining cards in the deck of fifty-two cards. If the gaming device selects the alternate presentation (alternate #1), the gaming device replaces the current presentation with the alternate presentation.

Figure 5C:
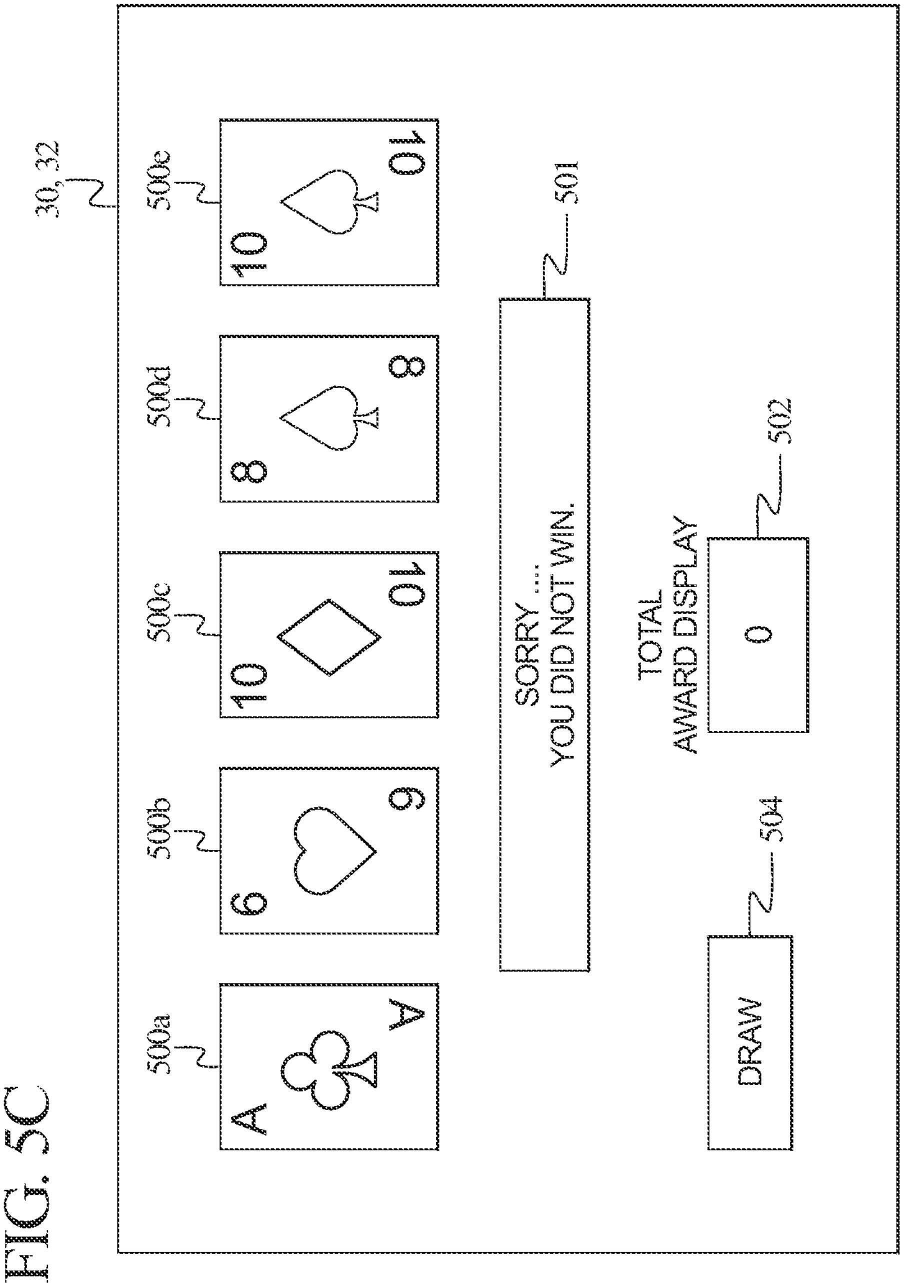

Referring to FIG. 5C, the gaming device selects the default presentation of the non-winning outcome. Thus, the gaming device presents or displays the cards that form the non-winning outcome according to the typical or normal presentation of the cards in the game. In this game, the default presentation of the cards includes replacing the non-held cards with cards selected from the remaining cards in the deck of cards. Therefore, the gaming device selects and replaces the non-held cards in the hand with cards including the ace of clubs, the six of hearts, and the eight of spades as shown in FIG. 5C. The instruction display 501 indicates to the player that this is a non-winning outcome in the game and no award is provided to the player as indicated by the total award display 502.

Figure 5D:
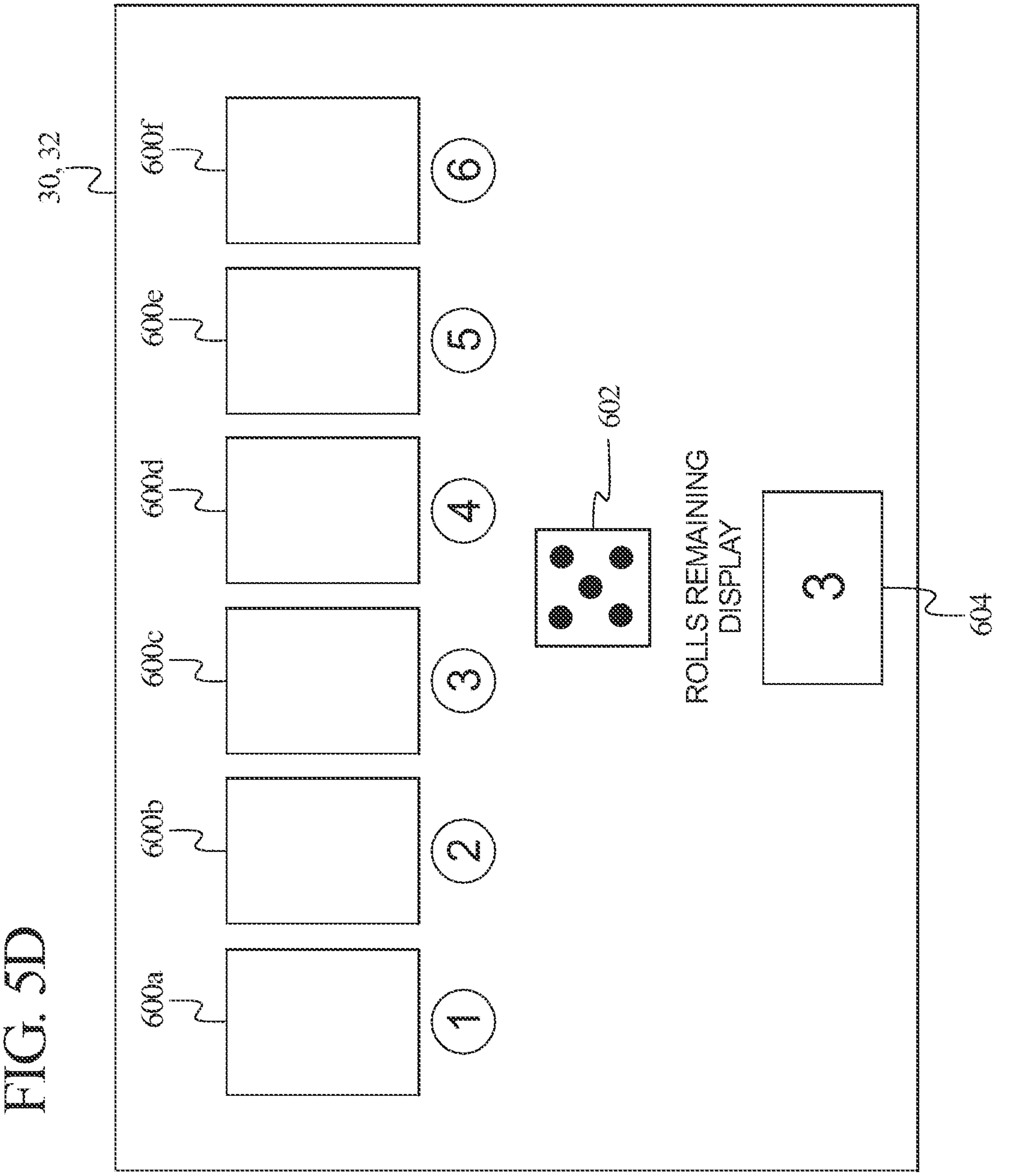

Referring to FIGS. 5D to 5H, the gaming device selects and presents the alternate presentation of the non-winning outcome instead of the default presentation. In this example, the gaming device selects the alternate presentation and thereby replaces the initial or base presentation of the cards with the alternate presentation as shown in FIG. 5D. The alternate presentation #1 or alternate display includes a conventional die 602 having symbols representing numbers one, two, three, four, five, and six. Alternate presentation #1 also includes six masked selections 600*a*, 600*b*, 600*c*, 600*d*, 600*e*, and 600*f*. Each of the numbers indicated by the die 602 are associated with one of the selections 600 as shown in FIG. 5D. Specifically, the number one is associated with selection 600*a*, the number two is associated with selection 600*b*, the number three is associated with the selection 600*c*, the number four is associated with the selection 600*d*, the number five is associated with the selection 600*e*, and the number six is associated with the selection 600*f*. The game provides the player with a number of activations or rolls of the die 602 as indicated by the rolls remaining presentation 604, wherein the number of rolls equals the number of cards that were not held in the player's hand in the base game. Because the player only held two of the cards in the player's hand in the base game, the player must replace three cards in the hand. The gaming device therefore provides three rolls of the die to the player in the game as indicated by the rolls remaining display 604.

Figure 5E:
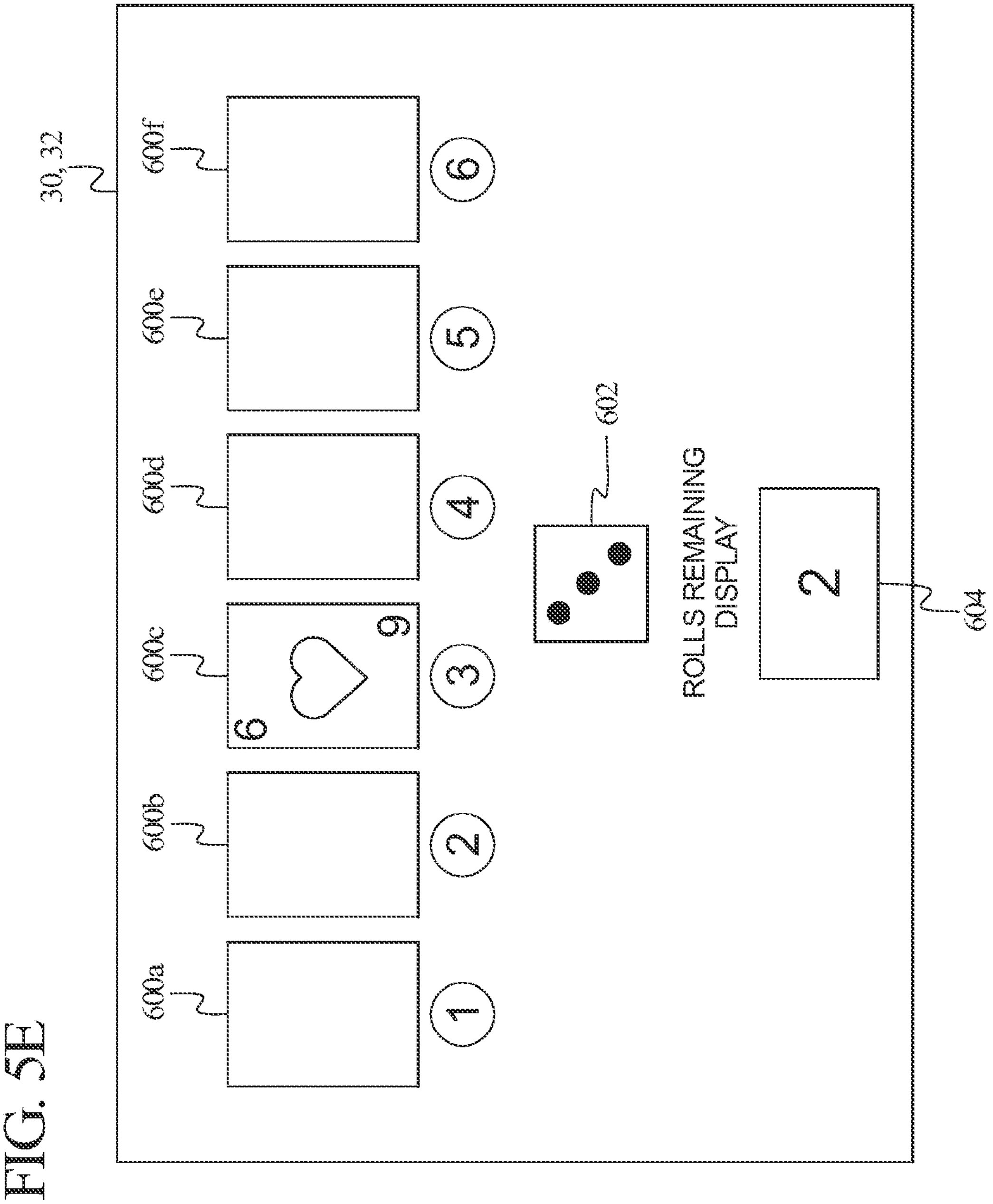

Referring to FIG. 5E, the gaming device or player activates the die for the first roll in the game. The die indicates a symbol representing the number three. The gaming device then associates one of the predetermined cards that form the non-winning outcome with the indicated selection. The number three is associated with selection 600*c* and therefore the gaming device associates the card including the six of hearts with this selection and then reveals the card associated with selection 600*c*. The revealed card 600*c* including the six of hearts remains revealed in the game to enable the player to view the cards that the player obtained in the game. The player now has two rolls remaining in the game as indicated by the rolls remaining display 604.

Figure 5F:
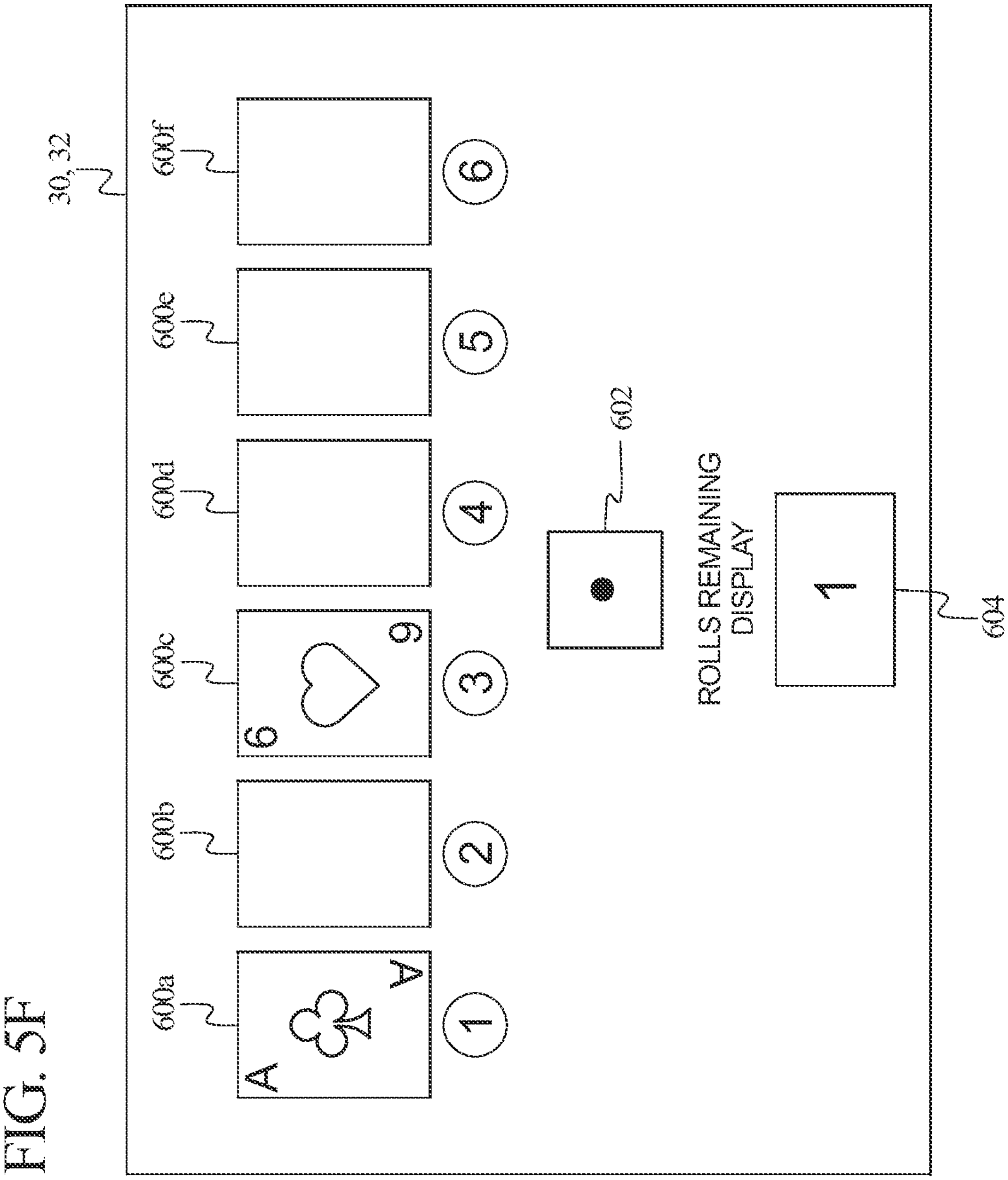

Referring to FIG. 5F, the gaming device or player activates or rolls the die 602 for a second time in the game. The die indicates a symbol representing the number one, which is associated with selection 600*a*. The gaming device associates the card including the ace of clubs with this selection and then reveals this card for selection 600*a*. The player has one roll remaining in the game as indicated by the rolls remaining display 604.

Figure 5G:
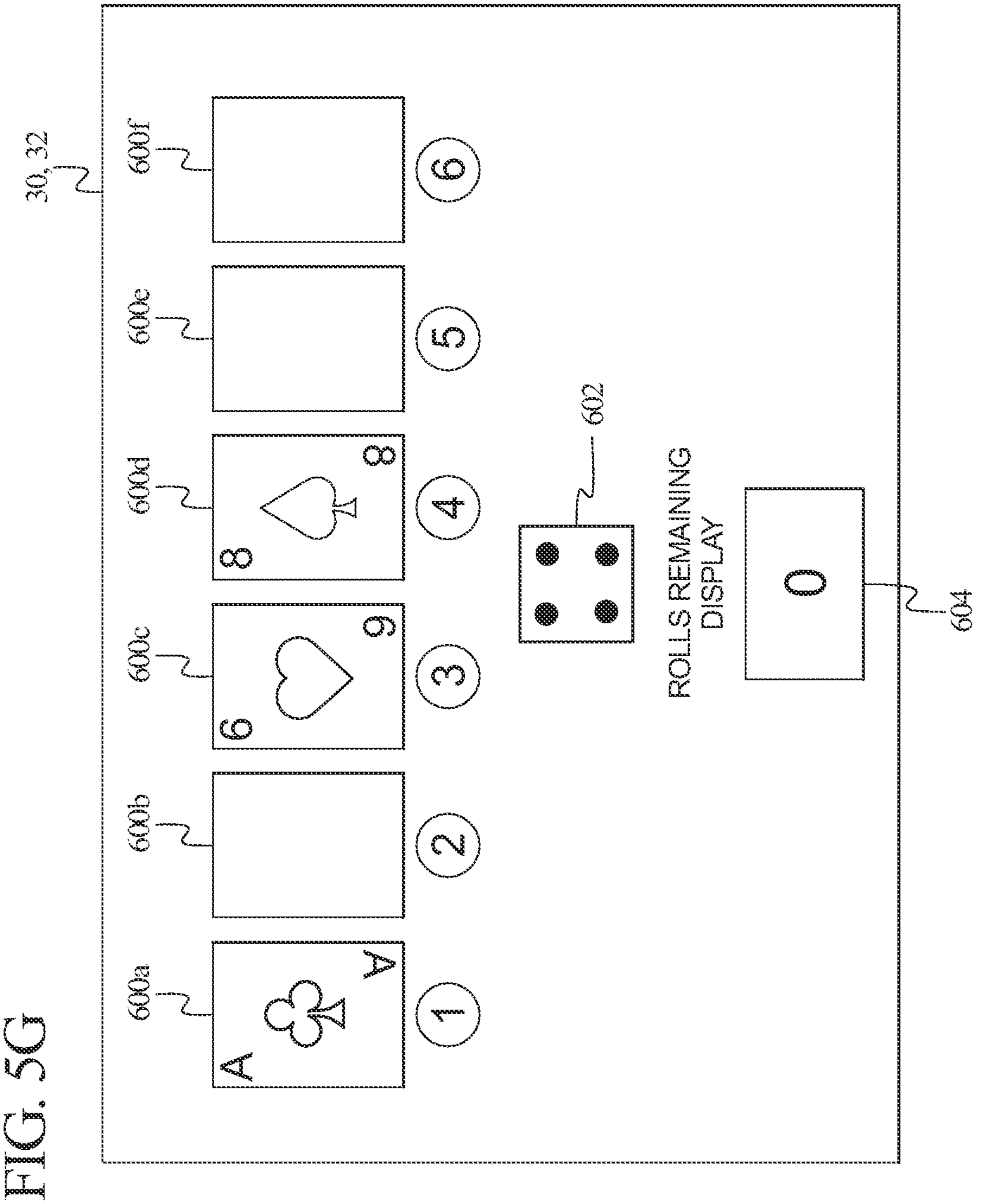

Referring to FIG. 5G, the gaming device or player activates or rolls the die for the final time in the game associated with the alternate presentation #1. The die indicates a symbol representing the number four, which is associated with selection 600*d*. The gaming device associates the card including the eight of spades with this selection and then reveals this card to the player. The player does not have any rolls remaining in the game as indicated by the rolls remaining display 604. The gaming device now replaces the alternate presentation with the initial or base game presentation.

Figure 5H:
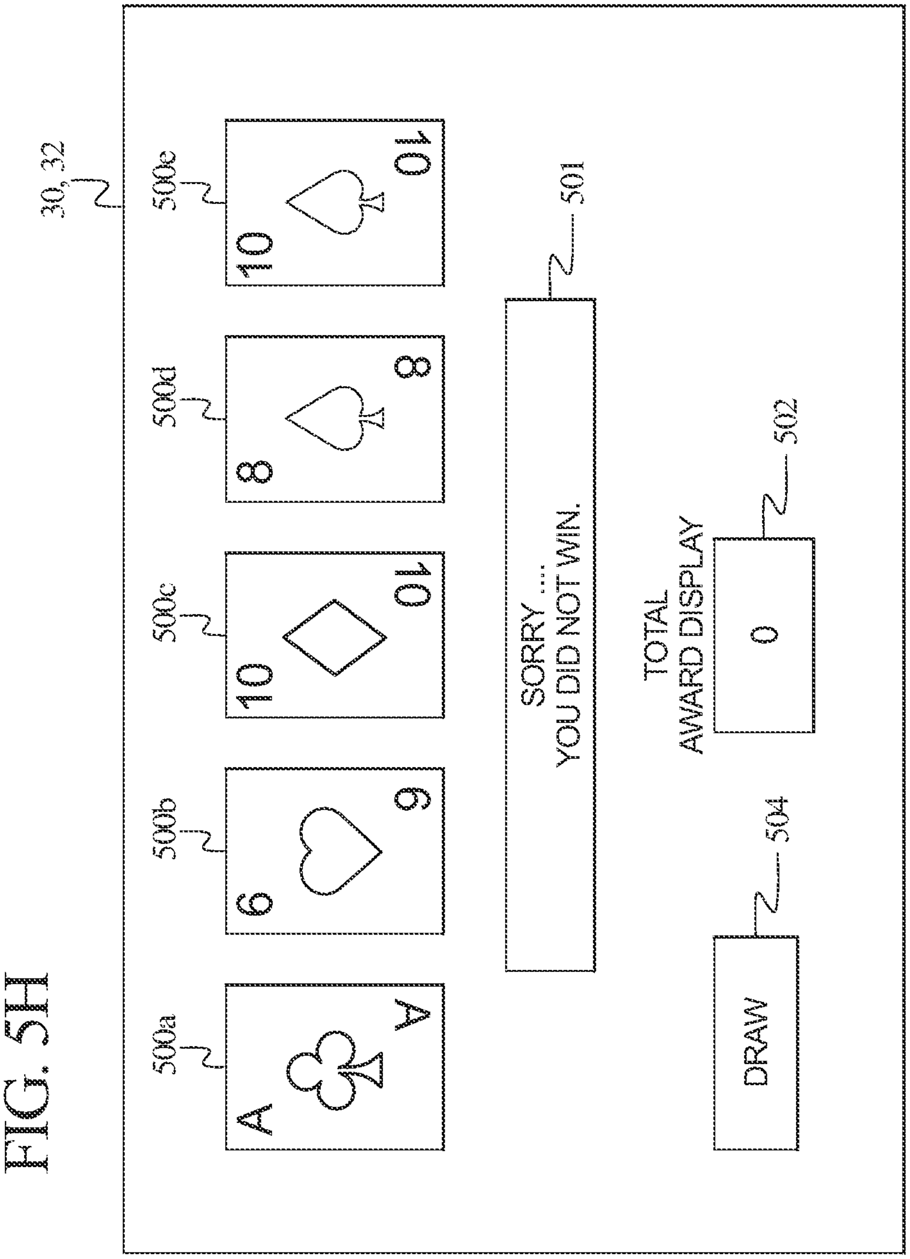

Referring to FIG. 5H, the initial or base presentation of the cards is displayed to the player on display device 30 or 32, and the non-held cards 500*a*, 500*b*, and 500*d* are replaced with the cards obtained in alternate presentation #1, which are the ace of clubs, the six of hearts, and the eight of spades, respectively. Thus, the alternate presentation of the cards provided the same non-winning outcome (i.e., the outcome included the same cards) to the player as provided by the default presentation shown in FIG. 5C, but in a different way.

As described above, the gaming device pre-determined that the player would not obtain a winning outcome in the game. Therefore, the combination of cards indicated in the player's hand do not indicate a winning outcome or winning hand because the pair of tens is less than or has a lesser value than a pair of jacks. Thus, the instruction display indicates to the player that the player did not win in this game as indicated by the instruction display 501. As a result, the player did not obtain award in this game as indicated by the total award display 502. The alternate presentation of the cards for non-winning outcomes therefore, indicate to the players that not all of the alternate presentations of the cards result in winning outcomes. This adds excitement and enjoyment for players because the players do not know if they will obtain a winning outcome in a game.

Figure 6A:
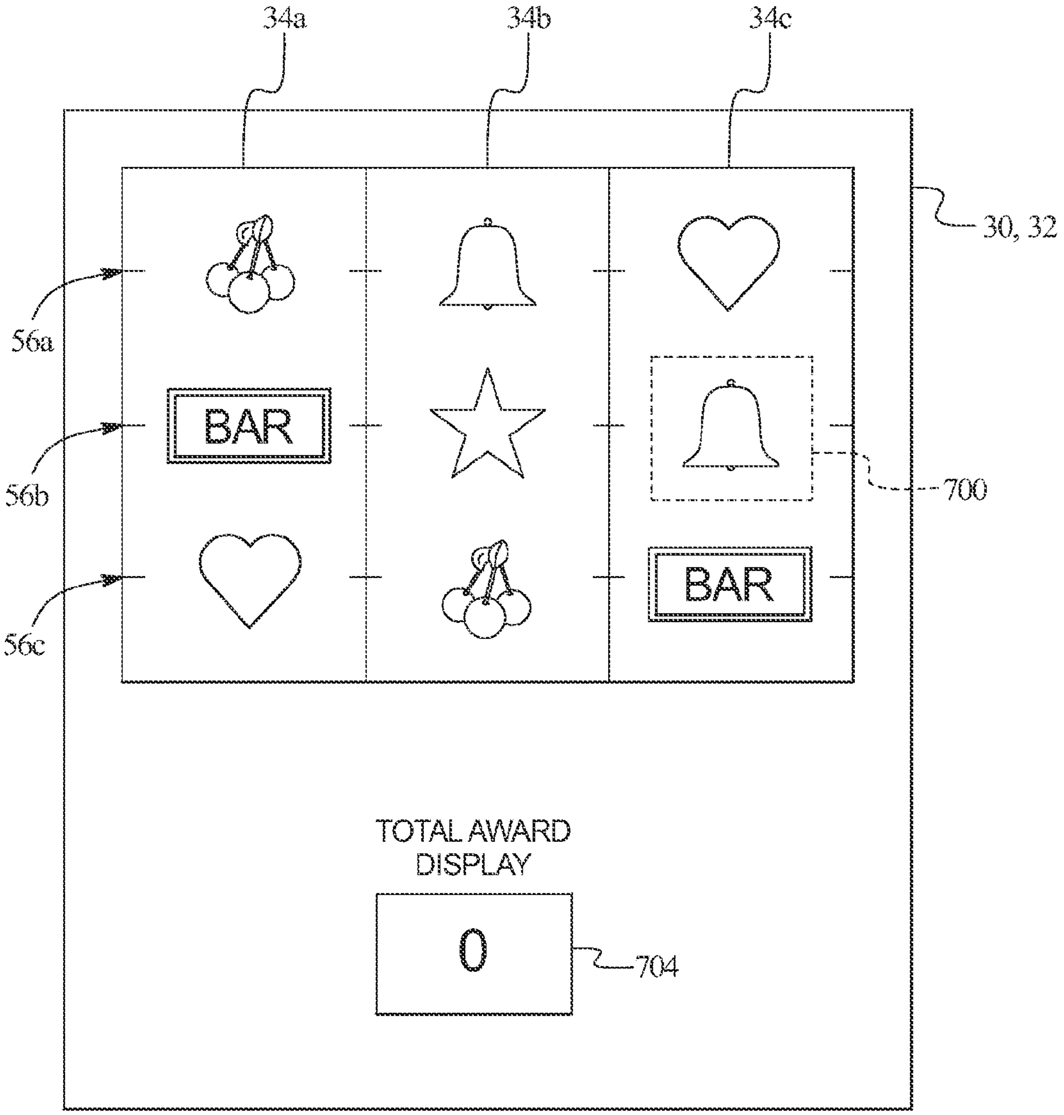
FIG. 6A is an enlarged front elevation view of another embodiment of the present invention illustrating a reel game including alternate presentations.
Figure 6B:
FIG. 6B is a schematic diagram of an award table associated with the embodiment of FIG. 6A.
Figure 6B:
Figure 6B:
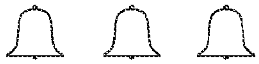
Figure 6B:
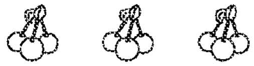

Referring to FIGS. 6A and 6B, an alternative embodiment of the present invention is illustrated where the present invention is employed in a reel type game. The reel game includes reels 34*a*, 34*b*, and 34*c* having indicia or symbols 700 indicated on the reels. Additionally, pay lines 56*a*, 56*b*, and 56*c* are associated with the reels. A total award display 704 indicates the total award accumulated by the player in the game.

In a reel type game such as the one shown in FIG. 6A, the gaming device pre-determines a combination of symbols to indicate to the player on one or more of the paylines in the game. The combination of symbols may be a winning outcome or a non-winning or losing outcome in the game. In another embodiment, the gaming device randomly determines a combination of symbols to provide to the player. After the gaming device determines the combination to provide to the player, the gaming device indicates one or more of the symbols included in the pre-determined combination on the reels, but the gaming device does not indicate all of the symbols in the combination.

Referring to FIG. 6B, an award table 703 is associated with the embodiment of FIG. 6A where column 706 indicates the winning and losing symbol combinations in the game. The table also indicates the different types of presentations of the symbols in column 708 that are associated with those symbol combinations. Column 710 shows the probabilities of each of those presentations or displays being selected and presented or displayed by the processor. Column 712 indicates the awards associated with each of the winning and non-winning combinations or outcomes in the game. In this embodiment, the gaming device activates or spins the reels to indicate one or more of the symbols in the predetermined or designated combination, but does not show all of the symbols in that combination. The gaming device then randomly selects one of the presentations associated with the predetermined combination based on the probabilities associated with the presentations for that combination. The default or typical presentation presents or displays the reels again and enables the player to spin or activate the reels for a second time to indicate the final symbol or symbols needed to complete the combination in the game. Thus, in the default presentation of the pre-determined outcome, the gaming device indicates the final symbol to complete the predetermined combination.

As described above, the gaming device may also select one or more of the alternate presentations of the outcome associated with a determined combination of symbols. The alternate presentations may be any type of presentations or displays. For example, the alternate presentation may include a presentation associated with a dice type game such as the game shown in FIGS. 5D to 5G or a card game as shown in FIG. 3A. Thus, the alternate game presentations include different presentations of the same game, different presentations associated with different games, or a combination of presentations associated with the same game and different games.

Referring to FIG. 7A to 7E, an example of the embodiment of FIGS. 6A and 6B is illustrated where the gaming device provides the player with three reels. The reels include symbols wherein the reels are activated to indicate a combination of symbols on payline 56*b*. In this example, the gaming device pre-determines or designates the combination to be indicated on the reels to be a winning combination of symbols including three bar symbols. Thus, the gaming device will spin the reels and indicate one or two of the symbols in the combination but not all of the symbols.

Figure 7A:
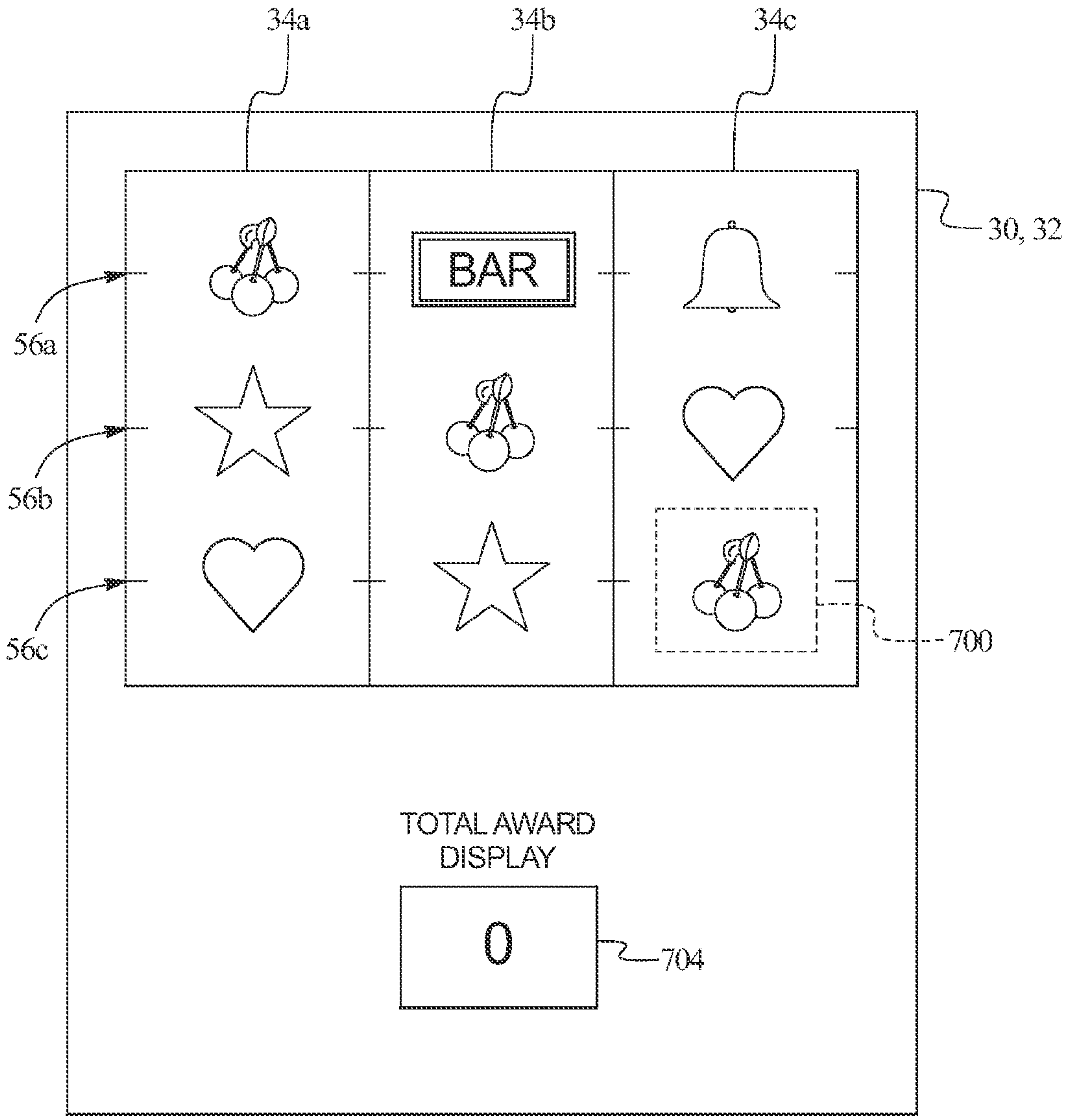
FIGS. 7A to 7E are enlarged elevation views of an example of the embodiment of FIGS. 6A and 6B illustrating a presentation of a winning outcome in a game.
Figure 7B:
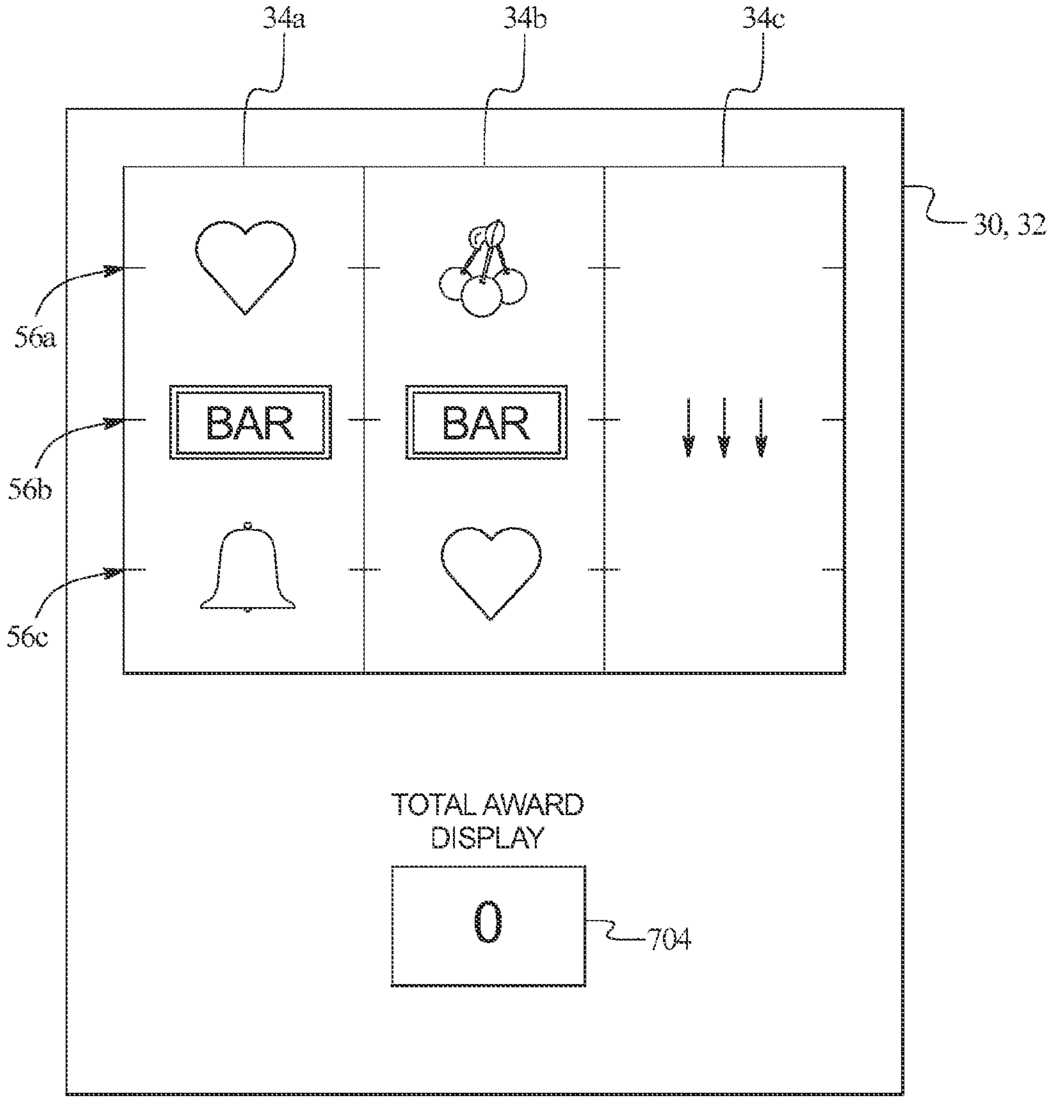

Referring to FIG. 7B, the gaming device therefore indicates two of the bar symbols on payline 56*b*, but does not indicate all of the bar symbols that form the predetermined combination of three bar symbols. The third reel 34*c* keeps spinning as shown in FIG. 7B. This provides enjoyment and excitement to the player because the player now must only obtain one more bar symbol to complete the combination of three bar symbols to obtain the largest award or jackpot award in the game. As shown in FIG. 6B, the combination including three bar symbols has three different types of the presentations associated with it. The first presentation is the default presentation which simply indicates the third symbol in the combination by stopping reel 34*c* and indicating the third bar symbol on payline 56*b*. The default presentation has a probability of 70% of being selected and presented or displayed by the gaming device. Additionally, there are two alternate presentations, such as alternates #1 and #2, which provide different presentations of the symbols in the pre-determined outcome. Alternate presentation #1 has a probability of 20% and alternate presentation #2 has a probability of 10%. The gaming device randomly selects one of these presentations associated with the combination including three bar symbols and presents the selected presentation to the player to indicate the third bar symbol in the game.

Figure 7C:
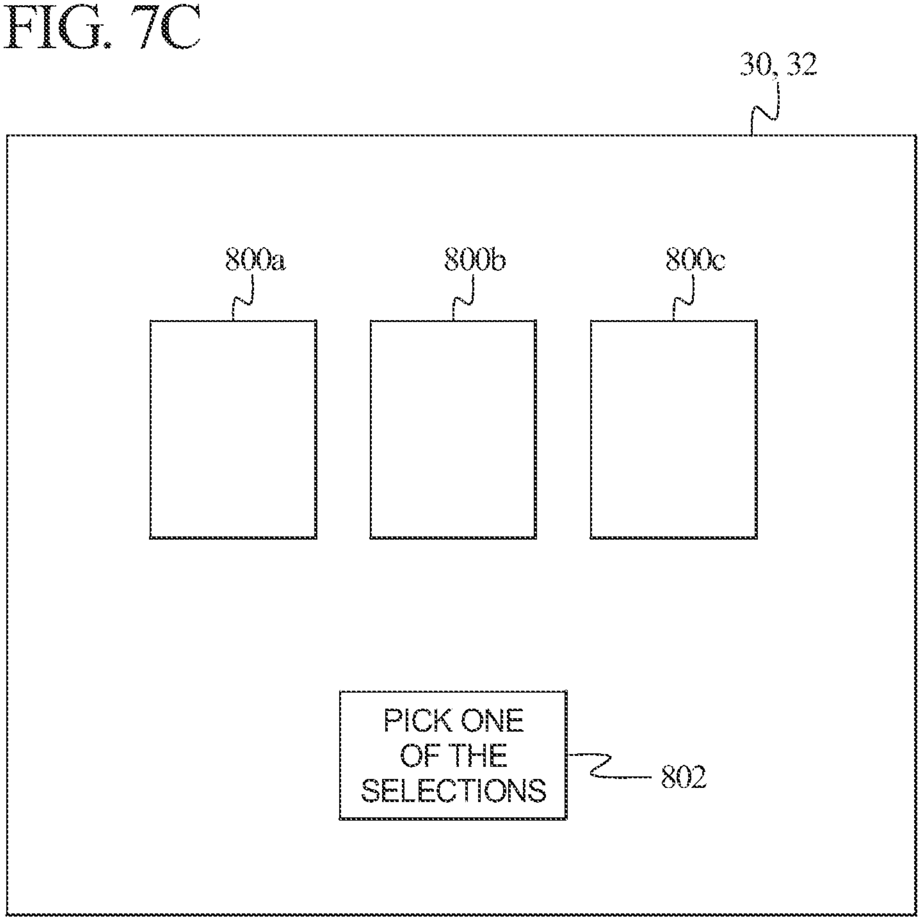

Referring to FIG. 7C, the gaming device picks alternate presentation #1 based on the probabilities indicated in FIG. 6B and therefore presents or displays this presentation to the player. The alternate presentation includes three selections 800*a*, 800*b*, and 800*c*. The selections are displayed on display device 30 or 32, wherein the alternate presentation replaces the original or base presentation of the game shown in FIG. 7A. The game also includes a pick button 802 which indicates "pick one of the selections" to the player. The player will pick one of the selections and the gaming device will associate the third bar symbol of the pre-determined outcome with that selection to complete the winning symbol combination. Although the gaming device has already predetermined that the player will win or obtain the third bar symbol, the player does not know the outcome of their selection and thereby their level of excitement and enjoyment increases when the alternate presentation is presented to the player.

Figure 7D:
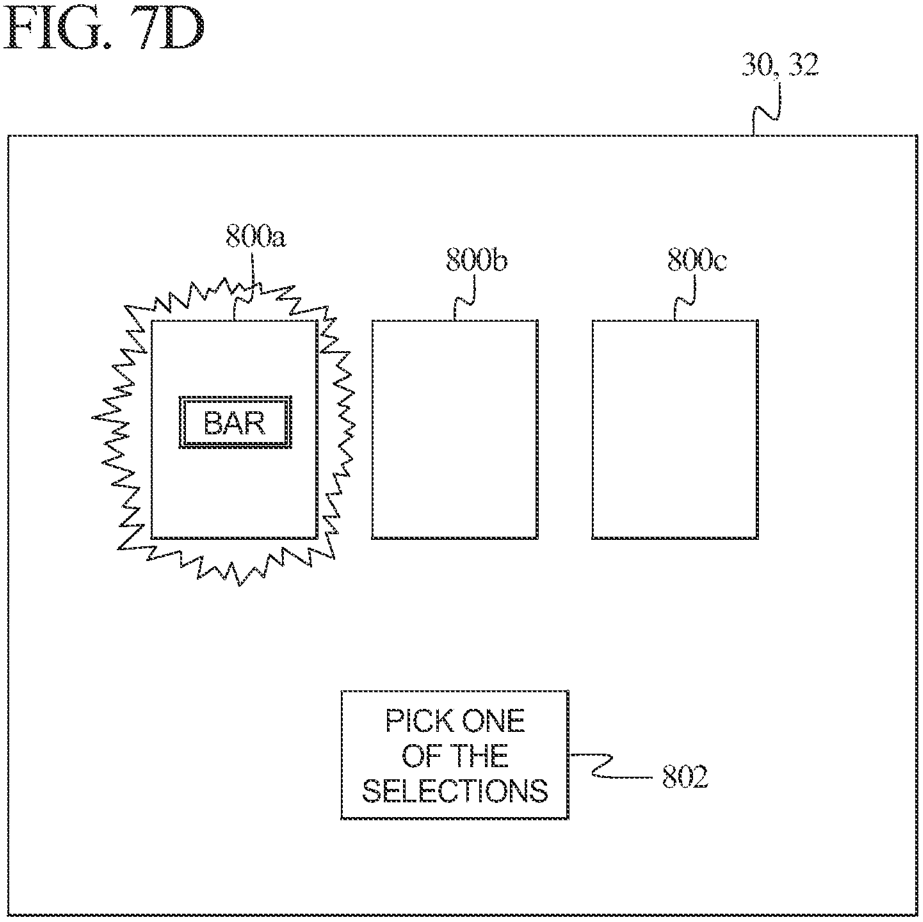

Referring to FIG. 7D, the player picks selection 800*a* which reveals a bar symbol. Because the gaming device predetermined that the player obtained the three bar symbol combinations in the game, the gaming device associates the bar symbol with the player's selection after the player picks the selection in the game. Therefore, the gaming device ensures that the player obtains the pre-determined or pre-designated winning combination including three bar symbols in the base game.

Figure 7E:
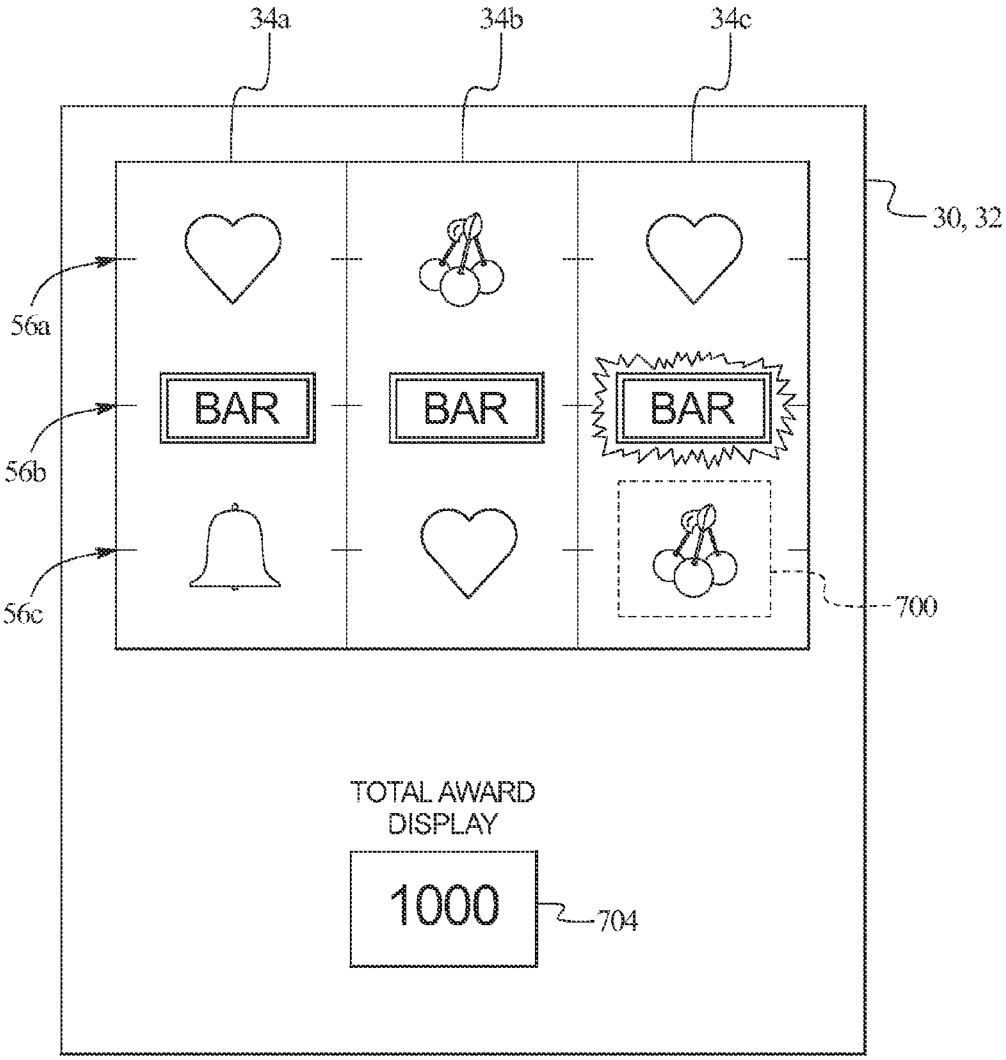

Referring to FIG. 7E, the third bar symbol is indicated on reel 34*c* to provide the player with the pre-determined winning combination of three bar symbols as indicated on reels 34*a*, 34*b*, and 34*c*. As shown in FIG. 6B, the winning combination of three bar symbols has an associated award of one thousand associated with it. Thus the gaming device provides the award of one thousand to the player as indicated in the total award display 704.

Although the present invention was illustrated in a card game and a reel type game, it should be appreciated that the present invention may be employed in any suitable type of game such as video poker, keno, blackjack, or any other suitable type of game. It should also be appreciated that the game displays including the default display and the alternate game displays may include displays associated with any suitable type of game.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a display device;

a wheel;

at least one input device;

at least one processor; and at least one memory device which stores a plurality of instructions, which when executed by the at least one processor, cause the at least one processor to operate with the display device, the wheel and the at least one input device to:

(a) receive at least one input from a player to initiate a play of a game;

(b) prior to displaying, for the play of the game, any generation of any complete combination of symbols in association with a plurality of reels or the wheel, determine a presentation of a game outcome for the play of the game, said determination based on at least one random generation for the play of the game which occurs separate from any random determination of the game outcome for the play of the game;

(c) display the determined presentation of the game outcome for the play of the game, said determined presentation of the game outcome displayed in association with one of: (i) the plurality of reels and (ii) the wheel; and (d) provide any award associated with the game outcome to the player.

2. The gaming system of claim 1, wherein said presentation displayed in association with the plurality of reels is a default presentation.

3. The gaming system of claim 1, wherein said presentation displayed in association with the wheel is an alternate presentation.

4. The gaming system of claim 1, wherein any provided award includes a quantity of non-monetary credits.

5. The gaming system of claim 1, wherein the presentation displayed in association with the plurality of reels and the presentation displayed in association with the wheel are each associated with a probability of being displayed.

6. The gaming system of claim 5, wherein said presentation displayed for the play of the game is based on said associated probabilities.

7. The gaming system of claim 6, wherein the wheel is a mechanical wheel.

8. The gaming system of claim 7, wherein the plurality of reels are mechanical reels.

9. The gaming system of claim 1, wherein the wheel is a mechanical wheel.

10. The gaming system of claim 9, wherein the plurality of reels are mechanical reels.

11. A system comprising:

a housing;

a plurality of reels supported by the housing;

a wheel supported by the housing;

at least one input device supported by the housing;

at least one processor; and at least one memory device which stores a plurality of instructions, which when executed by the at least one processor, cause the at least one processor to operate with the plurality of reels, the wheel and the input device to:

(a) receive at least one input from a player to initiate a play of a game;

(b) prior to displaying, for the play of the game, any generation of any complete combination of symbols in association with the plurality of reels or the wheel, make at least one random determination of whether to select the plurality of reels or the wheel to display a randomly determined game outcome for the play of the game, said reels having a higher probability of being selected than said wheel;

(c) if the reels are selected:

(i) spin the reels to cause the reels to display at least part of said determined game outcome for the play of the game, and (ii) provide any award to the player based on said displayed game outcome; and (d) if the wheel is selected:

(i) cause the wheel to display at least part of said determined game outcome for the play of the game, (ii) do not spin the reels to cause the reels to display any part of said determined game outcome for the play of the game, and (iii) provide any award to the player based on said displayed game outcome.

12. The gaming system of claim 11, wherein the wheel is a mechanical wheel.

13. The gaming system of claim 12, wherein the plurality of reels are mechanical reels.

14. The gaming system of claim 11, wherein the outcome for the play of the game is randomly determined separate from the random determination of whether to select the plurality of reels or the wheel.

15. The gaming system of claim 11, wherein any provided award includes a quantity of non-monetary credits.

16. A gaming system comprising:

a display device;

a mechanical award indicator separate from a plurality of reels;

at least one input device;

at least one processor; and at least one memory device which stores a plurality of instructions, which when executed by the at least one processor, cause the at least one processor to operate with the display device, the mechanical award indicator and the at least one input device to:

(a) receive at least one input from a player to initiate a play of a game;

(b) prior to displaying, for the play of the game, any generation of any complete combination of symbols in association with the plurality of reels or the mechanical award indicator, determine a presentation of a game outcome for the play of the game, said determination based on at least one random generation for the play of the game which occurs separate from any random determination of the game outcome for the play of the game;

(c) display the determined presentation of the game outcome for the play of the game, said determined presentation of the game outcome displayed in association with one of: (i) the plurality of reels and (ii) the mechanical award indicator; and (d) provide any award associated with the game outcome to the player.

17. The gaming system of claim 16, wherein said presentation displayed in association with the plurality of reels is a default presentation.

18. The gaming system of claim 16, wherein said presentation displayed in association with the mechanical award indicator is an alternate presentation.

19. The gaming system of claim 16, wherein the presentation displayed in association with the plurality of reels and the presentation displayed in association with the mechanical award indicator are each associated with a probability of being displayed.

20. The gaming system of claim 19, wherein said presentation displayed for the play of the game is based on said associated probabilities.

21. The gaming system of claim 16, wherein any provided award includes a quantity of non-monetary credits.

22. The gaming system of claim 16, wherein the plurality of reels are mechanical reels.

23. A gaming system comprising:

a housing;

a plurality of reels supported by the housing;

a mechanical award indicator separate from the plurality of reels, said mechanical award indicator supported by said housing;

at least one input device;

at least one processor; and at least one memory device which stores a plurality of instructions, which when executed by the at least one processor, cause the at least one processor to operate with the plurality of reels, the mechanical award indicator and the at least one input device to:

(a) receive at least one input from a player to initiate a play of a game;

(b) prior to displaying, for the play of the game, any generation of any complete combination of symbols in association with the plurality of reels or the mechanical award indicator, make at least one random determination of whether to select the plurality of reels or the mechanical award indicator to display a randomly determined game outcome for the play of the game, said reels having a higher probability of being selected than said mechanical award indicator;

(c) if the reels are selected:

(i) spin the reels to cause the reels to display at least part of said determined game outcome for the play of the game, and (ii) provide any award to the player based on said displayed game outcome; and (d) if the mechanical award indicator is selected:

(i) cause the mechanical award indicator to display at least part of said determined game outcome for the play of the game, (ii) do not spin the reels to cause the reels to display any part of said determined game outcome for the play of the game, and (iii) provide any award to the player based on said displayed game outcome.

24. The gaming system of claim 23, wherein the plurality of reels are mechanical reels.

25. The gaming system of claim 23, wherein the game outcome for the play of the game is randomly determined separate from the random determination of whether to select the plurality of reels or the mechanical award indicator.

26. The gaming system of claim 23, wherein any provided award includes a quantity of non-monetary credits.

27. A method of operating a gaming system, said method comprising:

(a) receiving at least one input from a player to initiate a play of a game;

(b) prior to displaying, for the play of the game, any generation of any complete combination of symbols in association with a plurality of reels or a wheel, determining a presentation of a game outcome for the play of the game, said determination based on at least one random generation for the play of the game which occurs separate from any random determination of the game outcome for the play of the game;

(c) displaying the determined presentation of the game outcome for the play of the game, said determined presentation of the game outcome displayed in association with one of: (i) the plurality of reels and (ii) the wheel; and (d) providing any award associated with the game outcome to the player.

28. The method of claim 27, wherein said presentation displayed in association with the plurality of reels is a default presentation.

29. The method of claim 27, wherein said presentation displayed in association with the wheel is an alternate presentation.

30. The method of claim 27, wherein the presentation displayed in association with the plurality of reels and the presentation displayed in association with the wheel are each associated with a probability of being displayed.

31. The method of claim 30, wherein said presentation displayed for the play of the game is based on said associated probabilities.

32. The method of claim 27, wherein any provided award includes a quantity of non-monetary credits.

33. The method of claim 27, which is operated through a data network.

34. The method of claim 33, wherein the data network is an internet.

35. A method of operating a gaming system, said method comprising:

(a) receiving at least one input from a player to initiate a play of a game;

(b) prior to displaying, for the play of the game, any generation of any complete combination of symbols in association with a plurality of reels or a wheel, making at least one random determination of whether to select the plurality of reels or the wheel to display a randomly determined game outcome for the play of the game, said reels having a higher probability of being selected than said wheel;

(c) if the reels are selected:

(i) spinning the reels to cause the reels to display at least part of said determined game outcome for the play of the game, and (ii) providing any award to the player based on said displayed outcome; and (d) if the wheel is selected:

(i) causing the wheel to display at least part of said determined game outcome for the play of the game, (ii) not causing the reels to spin to display any part of said determined game outcome for the play of the game, and (iii) providing any award to the player based on said displayed outcome.

36. The method of claim 35, which includes randomly determining the game outcome for the play of the game separate from the random determination of whether to select the plurality of reels or the wheel to display said game outcome.

37. The method of claim 35, wherein any provided award includes a quantity of non-monetary credits.

38. The method of claim 35, which is operated through a data network.

39. The method of claim 38, wherein the data network is an internet.

40. A method of operating a gaming system, said method comprising:

(a) receiving at least one input from a player to initiate a play of a game;

(b) prior to displaying, for the play of the game, any generation of any complete combination of symbols in association with a plurality of reels or a mechanical award indicator which is separate from the plurality of reels, determining a presentation of a game outcome for the play of the game, said determination based on at least one random generation for the play of the game which occurs separate from any random determination of the game outcome for the play of the game;

(c) displaying the determined presentation of the game outcome for the play of the game, said determined presentation of the game outcome displayed in association with one of: (i) the plurality of reels and (ii) the mechanical award indicator; and (d) providing any award associated with the game outcome to the player.

41. The method of claim 40, wherein said presentation displayed in association with the plurality of reels is a default presentation.

42. The method of claim 40, wherein said presentation displayed in association with the mechanical award indicator is an alternate presentation.

43. The method of claim 40, wherein the presentation displayed in association with the plurality of reels and the presentation displayed in association with the mechanical award indicator are each associated with a probability of being displayed.

44. The method of claim 43, wherein said presentation displayed for the play of the game is based on said associated probabilities.

45. The method of claim 40, wherein any provided award includes a quantity of non-monetary credits.

46. The method of claim 40, which is operated through a data network.

47. The method of claim 46, wherein the data network is an internet.

48. A method of operating a gaming system, said method comprising:

(a) receiving at least one input from a player to initiate a play of a game;

(b) prior to displaying, for the play of the game, any generation of any complete combination of symbols in association with a plurality of reels or a mechanical award indicator separate from said plurality of reels, making at least one random determination of whether to select the plurality of reels or the mechanical award indicator to display a randomly determined game outcome for the play of the game, wherein said plurality of reels have a higher probability of being selected than said mechanical award indicator;

(c) if the plurality of reels are selected:

(i) spinning the plurality of reels to cause the plurality of reels to display at least part of said determined game outcome for the play of the game, and (ii) providing any award to the player based on said displayed game outcome; and (d) if the mechanical award indicator is selected:

(i) causing the mechanical award indicator to display at least part of said determined game outcome for the play of the game, (ii) not spinning the plurality of reels to cause the plurality of reels to display any part of said determined game outcome for the play of the game, and, (iii) providing any award to the player based on said displayed game outcome.

49. The method of claim 48, which includes randomly determining the game outcome for the play of the game separate from the random determination of whether to select the plurality of reels or the mechanical award indicator.

50. The method of claim 48, wherein any provided award includes a quantity of non-monetary credits.

51. The method of claim 48, which is operated through a data network.

52. The method of claim 51, wherein the data network is an internet.

* * * * *

UNITED STATES PATENT AND TRADEMARK OFFICE

CERTIFICATE OF CORRECTION

PATENT NO. : 8,523,658 B2
APPLICATION NO. : 13/586635
DATED : September 3, 2013
INVENTOR(S) : David Haag et al.

It is certified that error appears in the above-identified patent and that said Letters Patent is hereby corrected as shown below:

IN THE CLAIMS

In Claim 11, Column 17, Line 16, between "A" and "system" insert --gaming--.
In Claim 11, Column 17, Line 26, between the third instance of "the" and "input" insert --at least one--.
In Claim 14, Column 17, Line 56, between the second instance of "the" and "outcome" insert --game--.
In Claim 14, Column 17, Line 58, between the first instance of "the" and "random" insert --at least one--.
In Claim 25, Column 19, Line 19, between "the" and "random" insert --at least one--.
In Claim 35, Column 20, Line 11, between "displayed" and "outcome" insert --game--.
In Claim 35, Column 20, Line 20, between "displayed" and "outcome" insert --game--.
In Claim 36, Column 20, Line 23, between "the" and "random" insert --at least one--.
In Claim 49, Column 22, Line 14, between "the" and "random" insert --at least one--.

Signed and Sealed this
Third Day of February, 2015

Michelle K. Lee
*Deputy Director of the United States Patent and Trademark Office*